(12) United States Patent
Merrell et al.

(10) Patent No.: US 6,362,462 B1
(45) Date of Patent: Mar. 26, 2002

(54) INDUCTION HARDENING COIL FOR A CRANKSHAFT

(75) Inventors: Neil A. Merrell, Fishers; John M. Storm, Danville, both of IN (US)

(73) Assignee: Contour Hardening, Inc., Indianapolis, IN (US)

( * ) Notice: Subject to any disclaimer, the term of this patent is extended or adjusted under 35 U.S.C. 154(b) by 0 days.

(21) Appl. No.: 09/699,892

(22) Filed: Oct. 30, 2000

Related U.S. Application Data

(63) Continuation-in-part of application No. 09/431,723, filed on Nov. 1, 1999, now Pat. No. 6,153,865, which is a division of application No. 09/148,478, filed on Sep. 8, 1998, now Pat. No. 6,013,904, which is a continuation-in-part of application No. 08/959,799, filed on Oct. 29, 1997, now Pat. No. 6,018,155.

(51) Int. Cl.$^7$ ................................................. H05B 6/36
(52) U.S. Cl. ..................... 219/672; 219/639; 219/674; 219/675; 219/676
(58) Field of Search ................. 219/639, 672, 219/673, 674, 675, 676, 640, 665, 632, 652, 656, 662, 650; 148/572, 575, 644, 526; 266/80, 92

(56) References Cited

U.S. PATENT DOCUMENTS

| | | | |
|---|---|---|---|
| 3,914,572 A | 10/1975 | Jensen | 219/639 |
| 3,935,416 A | 1/1976 | Cachat | 219/639 |
| 4,604,510 A | 8/1986 | Laughlin et al. | 219/639 |
| 4,675,488 A | 6/1987 | Mucha et al. | 219/640 |
| 4,714,809 A | 12/1987 | Hammond et al. | 219/639 |
| 4,728,761 A | 3/1988 | Mucha et al. | 219/639 |
| 4,757,170 A | 7/1988 | Mucha et al. | 219/640 |
| 4,816,633 A | 3/1989 | Mucha et al. | 219/665 |
| 4,867,810 A | 9/1989 | Novorsky et al. | 148/572 |
| 4,897,518 A | 1/1990 | Mucha et al. | 219/665 |
| 5,157,231 A | 10/1992 | Baeuerle et al. | 219/639 |
| 5,451,749 A | 9/1995 | Briebel et al. | 219/639 |
| 5,796,078 A | 8/1998 | Ottenwaelder et al. | 219/639 |
| 6,013,904 A | 1/2000 | Storm et al. | 219/639 |
| 6,018,155 A | 1/2000 | Storm et al. | 219/639 |
| 6,153,865 A | * 11/2000 | Storm et al. | 219/672 |

* cited by examiner

Primary Examiner—Tu Ba Hoang
(74) Attorney, Agent, or Firm—Woodard, Emhardt, Naughton, Moriarty & McNett

(57) ABSTRACT

An first induction hardening coil assembly according to one embodiment of the present invention comprises a coil having a top surface, an underside surface, and an inner coil curvature disposed between the top surface and the underside surface. The inner coil curvature extends approximately 180 degrees around a coil axis. The coil further includes a first end section adjacent a first end of the inner coil curvature which extends between the top surface and the underside surface. A second end section adjacent a second end of the inner coil curvature extends between the top surface and the underside surface. A support arm is connected to the coil and is constructed and arranged for providing an electrical connection between the coil and a source of electrical current. The support arm includes a current-in portion connected to the underside surface adjacent the first end section and a current-out portion connected to the top surface at a location which is between the first and second end sections.

In a cooperating, second induction hardening coil assembly which is used with the first coil assembly for a split pin pair, the current-in portion of the support arm is connected to the top surface adjacent the first end section. The current-out portion of the support arm is connected to the underside surface adjacent the first end section.

29 Claims, 23 Drawing Sheets

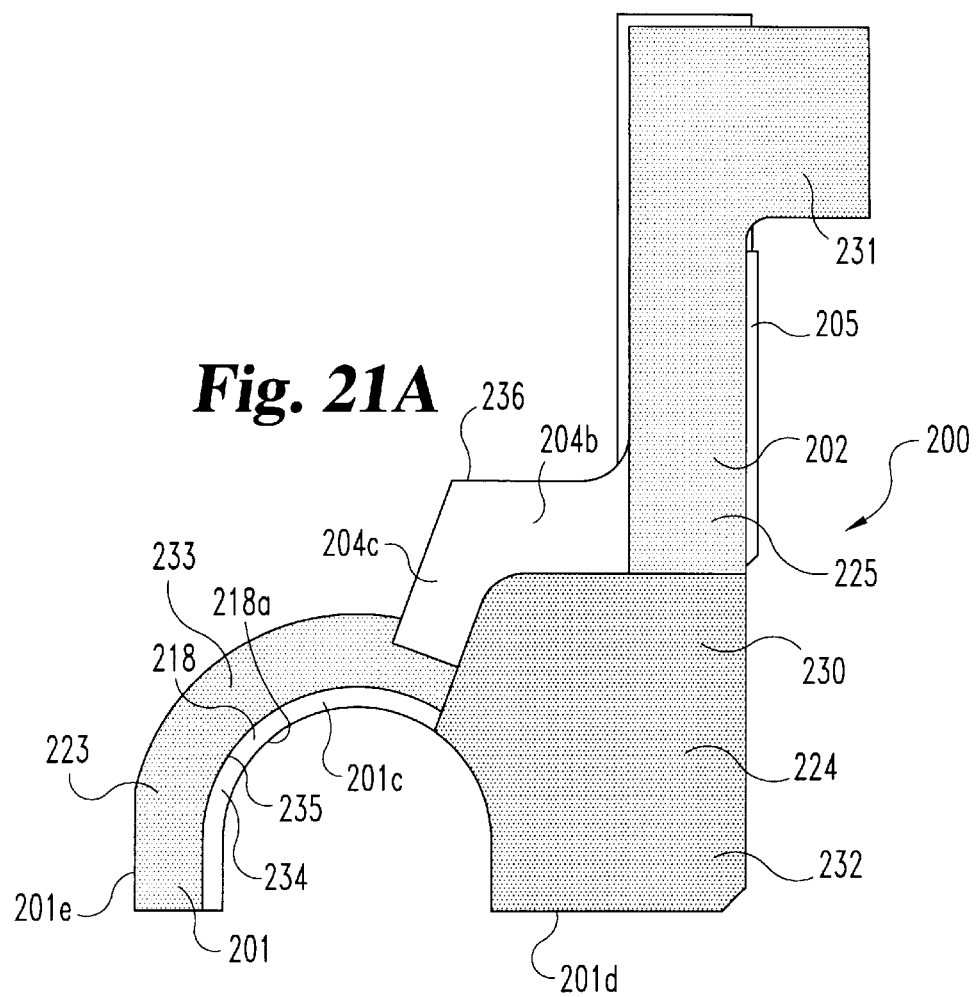
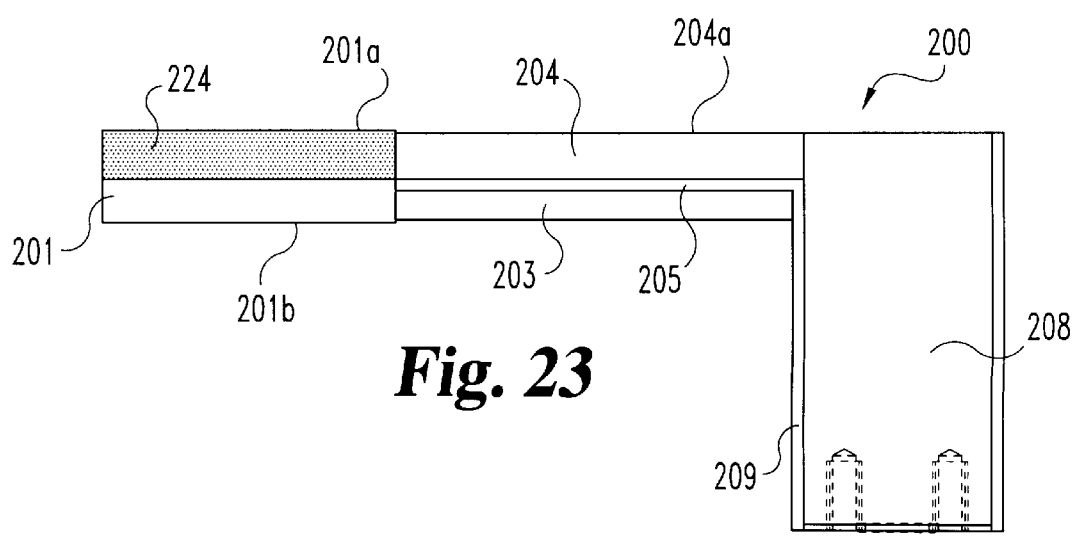

INDUCTION HARDENING COIL FOR A CRANKSHAFT

REFERENCE TO RELATED APPLICATIONS

The present patent application is a continuation-in-part patent application of U.S. patent application Ser. No. 09/431,723 filed Nov. 1, 1999, now U.S. Pat. No. 6,153,865, which is a divisional application Ser. No. 09/148,478, filed Sep. 8, 1998, now U.S. Pat. No. 6,013,904, issued Jan. 11, 2000, which is a continuation-in-part application Ser. No. 08/959,799, filed Oct. 29, 1997, now U.S. Pat. No. 6,018,155, issued Jan. 25, 2000.

BACKGROUND OF THE INVENTION

The present invention relates in general to methods and apparata for inductively heating and quench hardening a crankshaft. The broad scope of the present invention relates to inductively heating and quench hardening a crankshaft, which may be oriented either horizontally or vertically, wherein the induction coil assembly (or assemblies) do not contact the surfaces of the crankshaft which are to be induction hardened. Computer controlled servomotors and X and Y drive systems are used to position and move the induction coil assembly relative to a crankpin portion of the crankshaft as the crankshaft rotates at a predetermined RPM. The travel of the induction coil assembly is based upon mathematical formulae and the crankshaft geometry, including crankshaft dimensions and the particular location of the crankpin portion to be induction hardened relative to the longitudinal axis of the crankshaft. More specifically, the present invention focuses on the design of an induction coil for a crankshaft having a split-pin construction.

An automotive crankshaft is made up of a series of crankpins, one for each cylinder, in the case of in-line engines, or one for each pair of cylinders, in the case of V-type engines. The function of the crankshaft is to convert the reciprocating motion of the piston and its connecting rod into rotating motion. The throw of the crankshaft is equal to the stroke of the engine. The crankshaft needs to be properly balanced in order to eliminate centrifugal forces and accordingly the crankshaft is counterbalanced by weights placed opposite to the corresponding crankpins or just "pins". Each pin is received within one end of a corresponding connecting rod whose opposite end is pinned to a piston. Crankshafts are also configured with axial bearing surfaces which are designed for receipt by the main bearings. A six cylinder in-line crankshaft would typically have seven main bearings.

Due to the load and wear on the pins and on the bearing surfaces, the hardening of these portions of the crankshaft is important. One approach to this task is to inductively heat and then quench harden these critical surfaces. Traditionally the approach which has been followed is to place the crankshaft in a horizontal orientation and as the crankshaft reaches a substantially elevated temperature due to the induction heating, a support member is moved into position in order to support the crankshaft and keep it from sagging. This traditional approach also involves the induction coil and/or some portion of the induction coil assembly contacting and in fact actually riding on the surfaces which are to be inductively heated and quench hardened. This metal-to-metal contact accelerates the wear on the coil assembly, necessitating that the coil assembly be replaced periodically. The need to replace the induction coil assembly represents not only an added cost factor but also down time to the induction hardening equipment.

By orienting the crankshaft horizontally, the contact by the induction coil assembly on the critical surfaces of the crankshaft is actually encouraged due to the convenience of letting the induction coil assembly "ride" on the pins and bearing surfaces as the crankshaft is rotated between centers. This traditional approach of having the induction coil assembly function like a follower does not require any separate drive system for the induction coil assembly since the critical surfaces are in contact with the coil assembly. However, direct contact between the coil assembly and the portion of the crankshaft to be induction hardened is seen as a substantial disadvantage, not only due to wear of the induction coil assembly and the horizontal mounting of the crankshaft, but for the additional reasons which are set forth below.

When the induction coil assembly contacts the pins and/or bearing surfaces, it is difficult to identify the wear condition of the coil assembly. By riding directly on the crankshaft surfaces, the contacting surface of the induction coil assembly is effectively hidden from view, thereby making it difficult to assess the level or degree of wear on the coil assembly. This in turn means that the induction coil assembly can be run too long and reach a point at which it arcs out and this typically ruins the part and ruins or damages the coil assembly. Contact between the coil assembly and the crankshaft often results in marring or galling of the crankshaft surface and this requires extra grind stock which can then be machined away in order to grind out the surface imperfections. An extended post-hardening step is then required. It would be a substantial improvement to the present methods and apparata for induction hardening crankshafts if an apparatus could be provided whereby the induction coil assembly does not have to contact the pins and bearing surfaces. Such an apparatus would significantly improve coil assembly life.

According to the present invention, one induction coil assembly is provided for the crankshaft pins and may be located and operated at a first workstation. Either a separate induction coil assembly or a series of coil assemblies are provided for the bearing surfaces and may be located and operated at a second workstation. These coil assemblies are designed such that there is no contact with the crankshaft surfaces which the coil assemblies are to induction harden. This improves the coil assembly life. According to the present invention, the dimensions and geometry of the crankshaft are used to define the path or orbit of each pin and the tracking path for each induction coil assembly is computed and programmed into suitable drive systems which control the travel of each coil assembly. While the bearing surfaces also have an orbit, these orbits are concentric with the axis of rotation of the crankshaft. Accordingly the coil assembly (or assemblies) used for these bearing surfaces does not have to travel in a matching orbit, but instead is stationary.

While induction hardening of crankshafts is known, the present invention remains novel and unobvious. The combination of structural features of the present invention, including the induction coil designs which are disclosed, provide significant advantages to what presently exists and the long felt and heretofore unsatisfied need for the present invention validates its novel and unobvious advance in the art.

SUMMARY OF THE INVENTION

An induction hardening coil assembly for induction hardening of a workpiece according to one embodiment of the present invention comprises a coil having a top surface, an underside surface, and an inner coil curvature disposed between the top surface and the underside surface, the inner coil curvature extending approximately 180 degrees around a coil axis, the coil further including a first end section adjacent a first end of the inner coil curvature and extending between the top surface and the underside surface and a second end section adjacent a second end of the inner coil curvature and extending between the top surface and the underside surface, and a support arm connected to the coil and being constructed and arranged for providing an electrical connection between the coil and a source of electrical current, the support arm including a current-in portion connected to the top surface via said first end section and a current-out portion connected to the underside surface at a location which is between the first and second side surfaces.

One object of the present invention is to provide an improved induction hardening coil for the induction hardening of a workpiece.

Related objects and advantages of the present invention will be apparent from the following description.

BRIEF DESCRIPTION OF THE DRAWINGS

FIG. 21A is a top plan view of a "hybrid" induction hardening coil assembly as it is used according to the present invention.

FIG. 23 is a right side elevational view of the FIG. 21 induction hardening coil assembly.

DESCRIPTION OF THE PREFERRED EMBODIMENT

Figure 1:
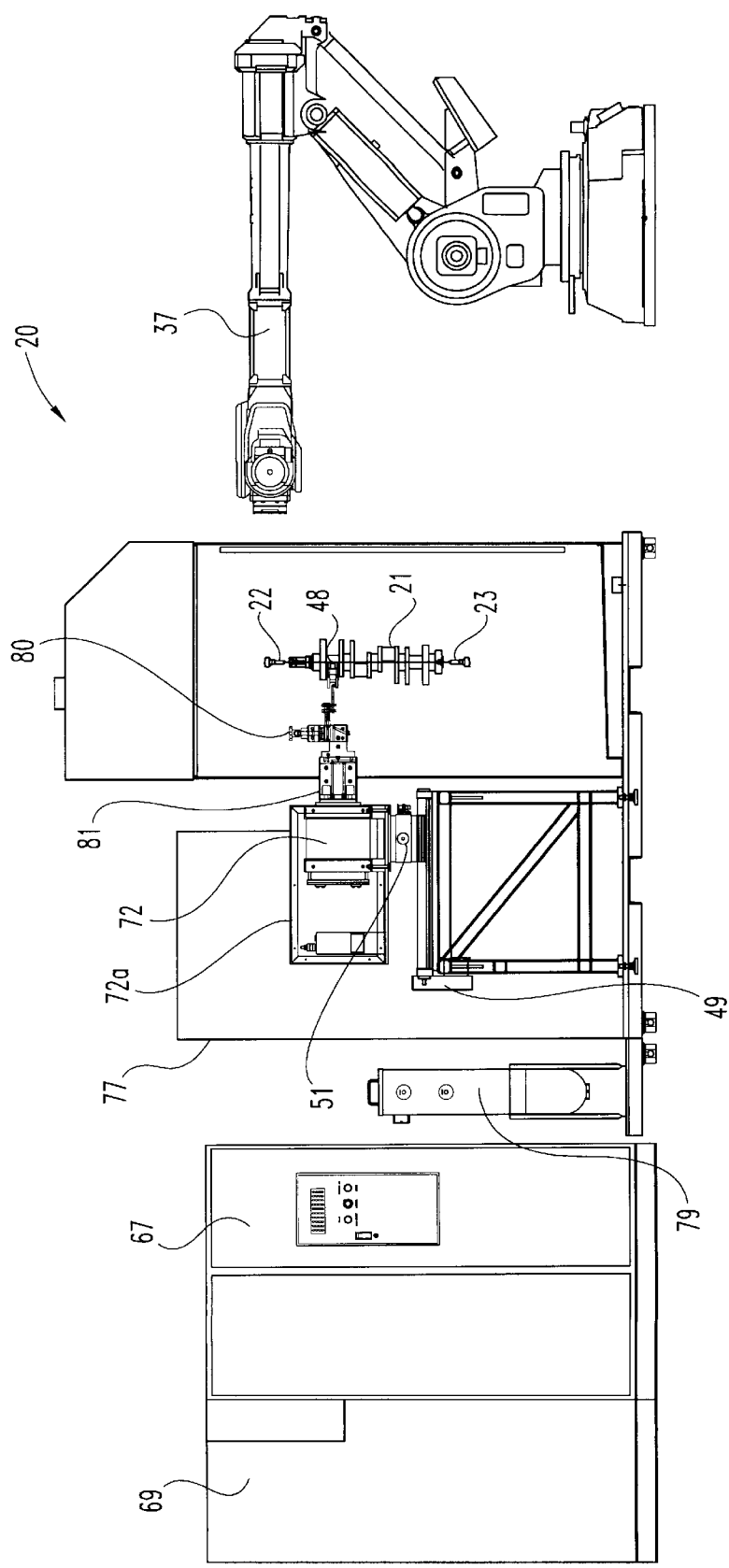
FIG. 1 is a side elevational view of an induction hardening apparatus for the pins of a crankshaft according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

U.S. Pat. No. 6,013,904, which issued on Jan. 11, 2000 to Storm, et al., discloses and claims an "induction hardening apparatus for a crankshaft". Included in the disclosed subject matter of this patent is the use of induction coils for the induction hardening of portions of a crankshaft. In addition, two specific induction coil styles are disclosed. U.S. Pat. No. 6,013,904 is incorporated by reference herein for the entirety of its disclosure, including the corresponding drawings.

Figure 5:
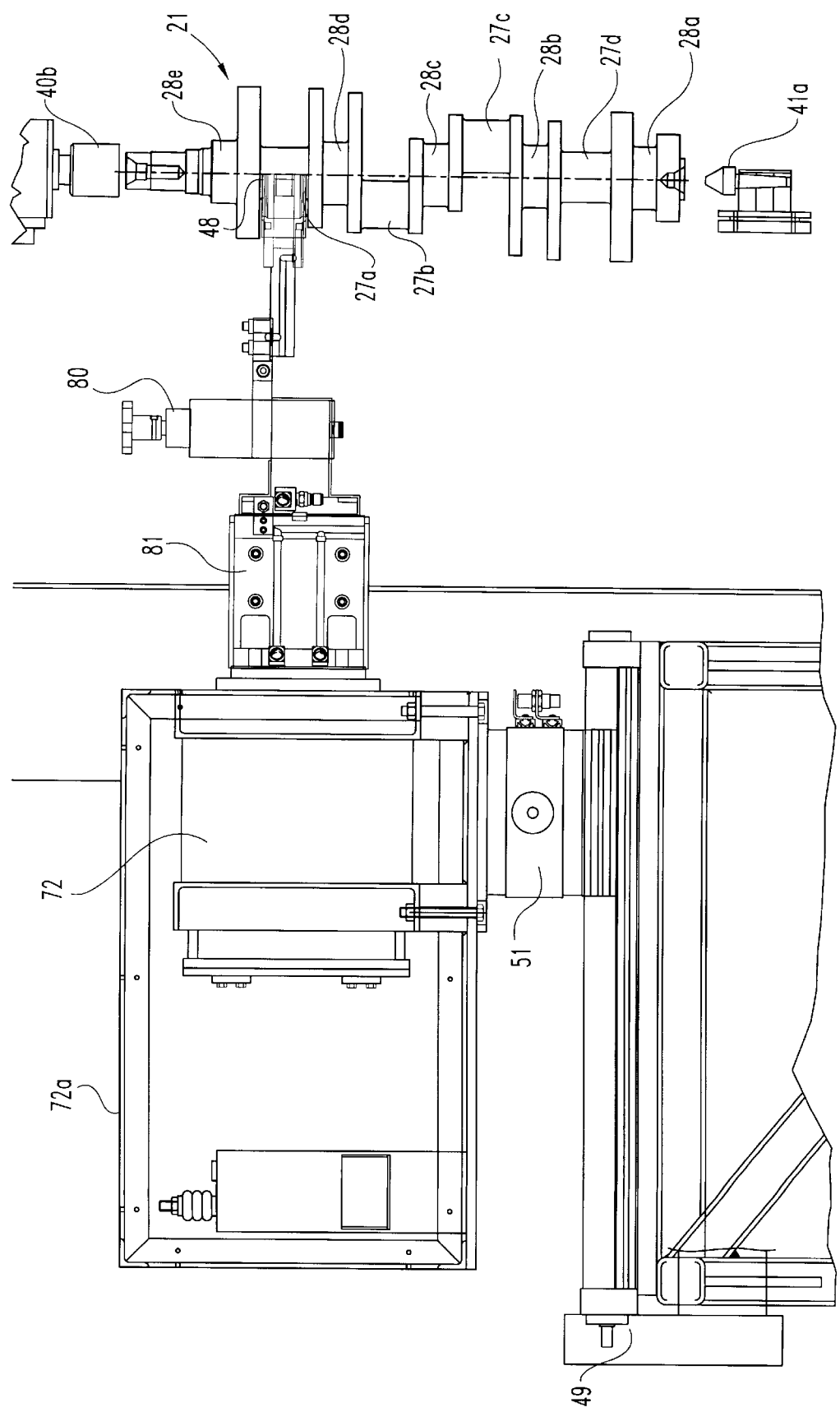
FIG. 5 is an enlarged side elevational view of the crankshaft to be induction hardened by the FIG. 1 induction hardening apparatus, including portions of the coil drive system.

Referring to FIGS. 1, 2, 3, 4, 5, 6, and 6A, there is illustrated an induction hardening apparatus 20 which is constructed and arranged for inductively heating and quench hardening a crankshaft 21. Crankshaft 21 is positioned in a vertical orientation and supported between centers 22 and 23. The illustration of the upper center 22 should be regarded as merely diagrammatic for the purpose of representing a true vertical orientation for the crankshaft. In actual practice when the pins of the crankshaft are being induction hardened, a positive lock (chuck) is required and is used. This is illustrated in FIG. 5. This fixturing of the crankshaft permits the use of a cooperating rotary drive mechanism in order to rotatably spin the crankshaft, on axis, between the positive lock (chuck) and lower center 23. Although the crankshaft 21 in FIGS. 1 and 5 is illustrated in a vertical mounting orientation between vertical centers, the induction coils of the present invention are suitable for use with a crankshaft which is positioned in a substantially horizontal orientation between horizontal centers.

With continued reference to FIG. 5, the details of crankshaft 21 are illustrated. The crankshaft which is used as part of the explanation of the induction coils of the present invention includes four cylinder (crank) pins 27a–27d and five cylindrical bearing surfaces 28a–28e. As would be known to one of ordinary skill in the crankshaft art, balance weights are disposed in cooperative relation to each pin in order to counterbalance the pin rotation and preferably eliminate any net centrifugal force. The pins 27a–27d and bearing surfaces 28a–28e are arranged in alternating sequence and represent critical wear surfaces which need to be hardened and the preferred method is by inductively heating and quench hardening these critical portions of the crankshaft. This is the role of apparatus 20 which is constructed and arranged to sequentially position an induction coil assembly adjacent each pin 27a–27d and perform the required heat treating steps. The bearing surfaces 28a–28e are inductively heated and quench hardened at another workstation which in one embodiment of the present invention comprises another portion of apparatus 20. In one embodiment (see FIG. 6A), the water quench capability is built into the induction coil assemblies which are used for the pins and bearing surfaces. In another embodiment, the quench step is performed by a separate quench station which is not built into the coil assembly.

According to the present invention there are actually three primary configurations for apparatus 20 with a secondary variable for each primary configuration. In the illustrations of FIGS. 1–4, apparatus 20 includes two virtually identical workstations, both of which are designed for the induction hardening of pins. This configuration permits two crankshafts to be induction hardened simultaneously, in a side-by-side arrangement.

When a coil assembly of the present invention is positioned adjacent to a particular pin for inductively heating and quench hardening, the coil assembly is moved in an X/Y direction so as to track or trace the same orbit without contacting any portion of the crankshaft. In a further embodiment of the present invention, the orbit or tracking path of the coil assembly is designed to change the spacing between the coil portion of the coil assembly and the crankshaft pin in order to adjust for heat loss due to the presence of the counterweights and thereby achieve a uniformity of case depth. The adjustment for counterweight heat loss can also be achieved by rapidly changing the kW output of the power supply. While reference has been made to the heat loss caused by the counterweights, the corresponding adjustments represented by the alternate embodiments can be practiced whenever there is a structure or any other reason which affects the balance of mass (heat balance) adjacent the pins (or pin) of the crankshaft.

With continued reference to the first embodiment, by precisely entering dimensional and positional data into a servodrive system, the present invention moves the induction coil assembly in a way to maintain substantially uniform spacing between the inner surface of the coil assembly and the outer surface of the particular pin. Since the bearing surfaces are coaxial with the vertical centers, the "orbit" of each bearing surface is on-axis and all bearing surface orbits are the same. Accordingly, the induction coil assemblies of the present invention as well as the coil positioning systems are described as being "contact-free" because they do not contact the surfaces of the crankshaft which are to be induction hardened.

Figure 2:
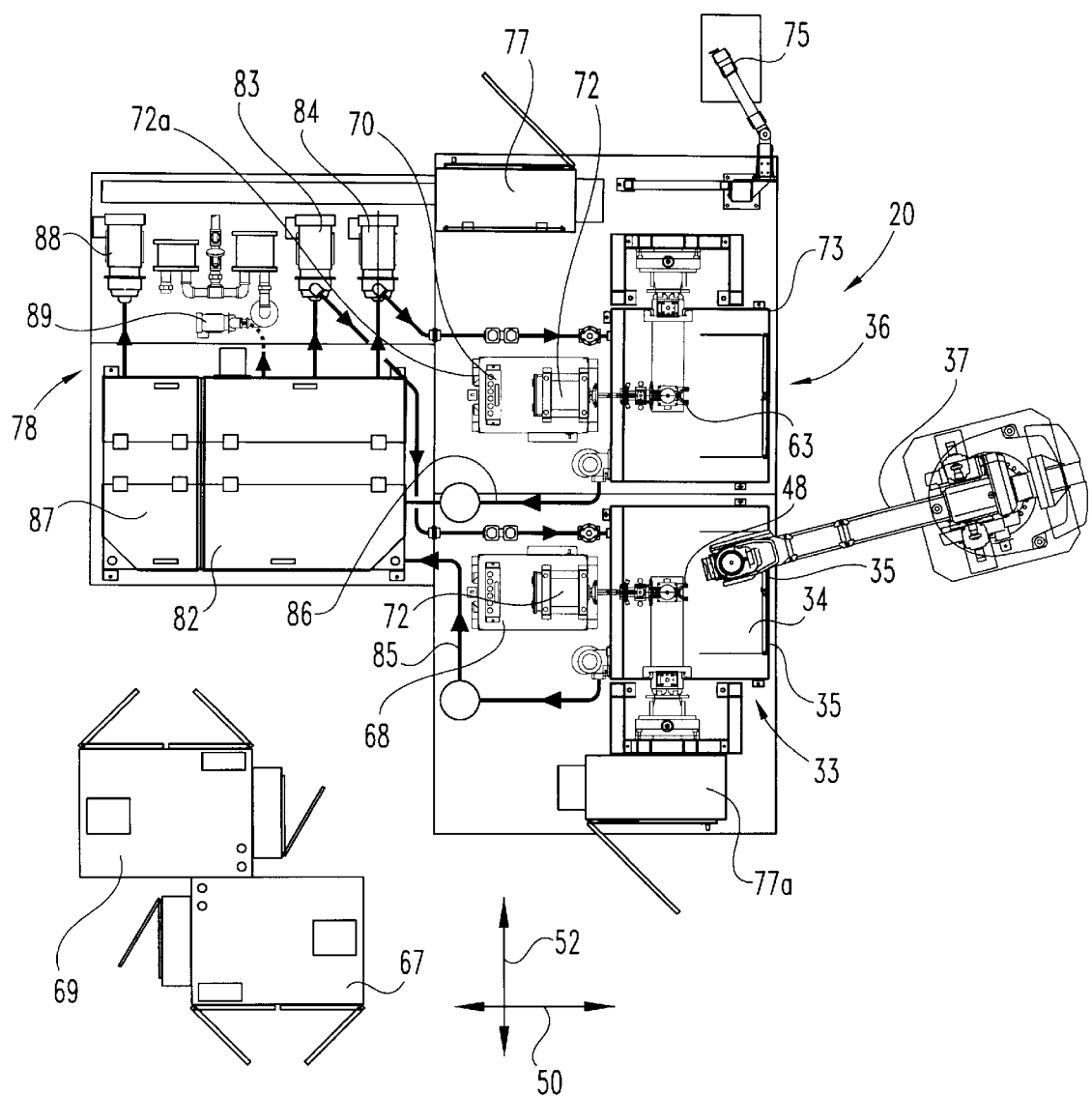
FIG. 2 is a top plan view of the FIG. 1 induction hardening apparatus.
Figure 3:
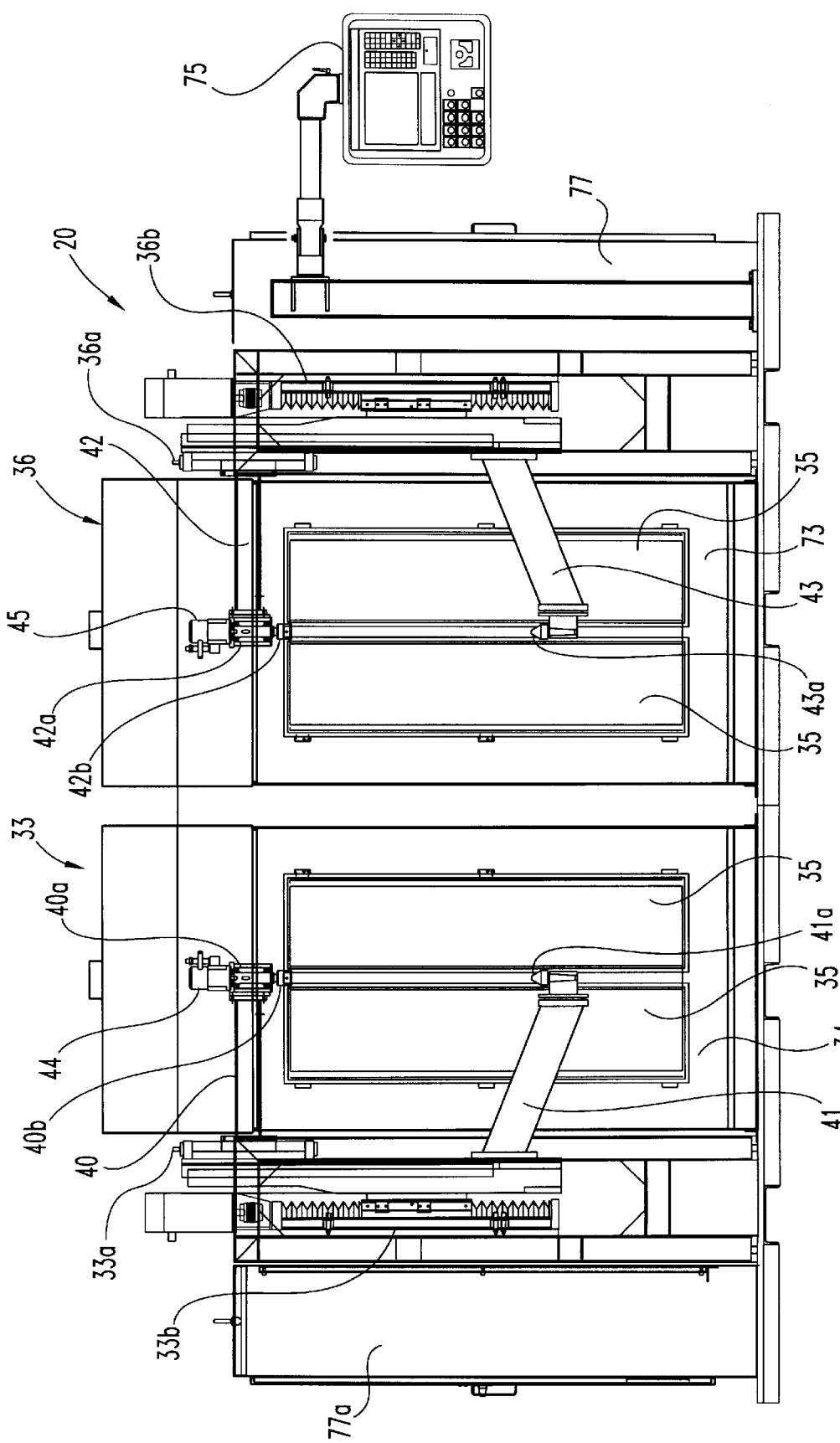
FIG. 3 is a front elevational view of the FIG. 1 induction hardening apparatus.
Figure 4:
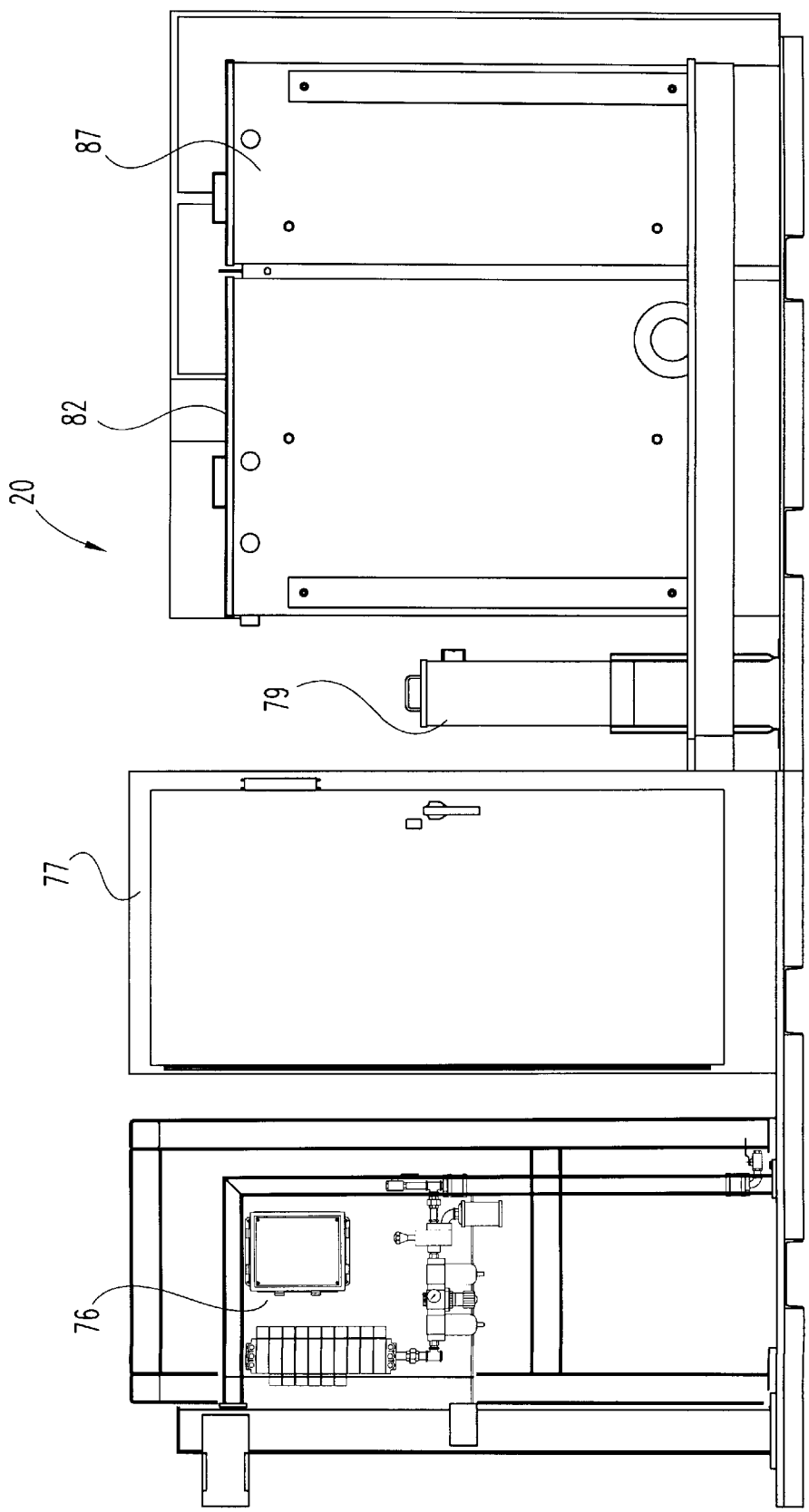
FIG. 4 is a right side elevational view of the FIG. 1 induction hardening apparatus.

With regard to FIGS. 1, 2, 3, and 4, FIG. 2 is a complete top plan view of apparatus 20. The remaining figures each have some portion removed for drawing clarity. In FIG. 1, portions of the controls, frame, and drive spindle have been removed for drawing clarity. In FIG. 3, the crankshaft, system components, and robot have been removed for drawing clarity, while in FIG. 4, the human/machine interface (HMI) has been removed. Consequently, these four figures should be considered together as a complementing set.

Based on the illustrations of these drawing figures, induction hardening apparatus 20 includes a first workstation 33 located within an enclosure 34 with front-side access doors 35 and a second workstation 36 of a similar construction. The two workstations are illustrated with doors 35 closed, but with the arms, centers, drives and bearings illustrated. Therefore, FIG. 3 should be regarded as diagrammatic with regard to what it illustrates behind the closed doors 35. At the first workstation, the pins 27a–27d of a first crankshaft are inductively heated and quench hardened. In one embodiment a single coil is used and the pins are sequentially induction hardened.

At the second workstation 36, the pins of a second crankshaft are inductively heated and quench hardened. In essence the two workstations 33 and 36 are of virtually identical construction and are used concurrently to induction harden two separate crankshafts. The crankshafts at the two workstations have not been illustrated in FIG. 3 for drawing clarity. The two crankshafts which are induction hardened at the two workstations 33 and 36 are loaded and unloaded by means of robot 37. If a second apparatus 30 is present for the induction hardening of the bearing surfaces of the two crankshafts, then the crankshafts are also moved to the bearing surface apparatus 30 by a robot mechanism such as robot 37. At this second apparatus location, the bearing surfaces 28a–28e are inductively heated and quench hardened. When completed, the robot 37 removes the crankshafts and loads the next crankshafts into position at the first apparatus.

With continued reference to FIGS. 2 and 3, the processing of crankshaft 21 at workstation 33 will be described in detail. It should be understood that the structure of workstation 36 is virtually identical when induction hardening the pins of a second crankshaft. Crankshaft 21 is moved into position at workstation 33 of apparatus 20 and held in the desired vertical orientation by the robot arm until the support arms 40 and 41 at the first workstation 33 (and support arms 42 and 43 at the second workstation 36) take over the vertical positioning and support of the crankshaft 21. Each support arm 40–43 is automatically moved into position based upon programmable logic control circuitry which is used to preprogram the mechanical drive systems and servos associated with each support arm. Each lower support arm 41 and 43 is assembled with a centering spindle tip 41a and 43a, respectively, for insertion into a corresponding center socket in the end of the crankshaft which is loaded into position at the corresponding workstation. The upper support arms 40 and 42 are each assembled with a bearing housing 40a and 42a, respectively, and a cooperating chuck 40b and 42b, respectively, which is used to lock onto the upper end of the crankshaft. The fixturing of the crankshaft in this manner maintains a true vertical orientation and provides a true vertical axis for rotation of the crankshaft on its longitudinal centerline which is concentric with the geometric centerline axis of each cylindrical bearing surface 28a–28e.

While the axial position of each upper arm 40 and 42 during the steps of inductive heating and quench hardening is the same for each crankshaft, regardless of the size or length, lower arms 41 and 43 are moveable and can be axially shifted to different "run" positions in order to accommodate different crankshaft lengths. Mounted at the end of upper arm 40 is an electric current spindle motor 44 for rotatably spinning the crankshaft at a predetermined rate. A similar electric current spindle motor 45 is mounted at the end of upper arm 42 for spinning rotation at the second workstation. Spinning of the crankshaft is generally beneficial in order to make a uniform and balanced heating pattern in the workpiece, whatever portion might be the focus of the induction hardening. Spinning of the crankshaft is also beneficial for uniform quenching. Since the induction coil assembly used at each workstation of each apparatus as part of the present invention has an open, semicylindrical shape, it is essential that each crankshaft be rotated in order to get complete and uniform heating of the critical portions of the crankshaft. At the first apparatus 20, including both workstations 33 and 36, these critical portions are the pins 27a–27d.

The following description regarding the first workstation 33 is virtually identical for the second workstation 36. Upper arm 40 is connected to a clamp cylinder 33a (cylinder 36a at workstation 36) which is used to clamp the corresponding crankshaft between chuck 40b and centering spindle tip 41a. The vertical movement of the chucked and centered crankshaft involves the vertical positioning portion 33b (portion 36b at workstation 36) which provides the Z-axis drive. This Z-axis drive is a ball screw servodrive and is used to shift the vertical position of the crankshaft when it is desired to move the crankshaft so that a different pin is positioned adjacent the corresponding induction coil assembly.

In one embodiment of the present invention a single induction coil assembly 48 is located at the first workstation 33 and is securely mounted to a Y-drive system 49 which is controlled by suitable servo circuitry, based upon part geometry and dimensions which are derived from the crankshaft drawings or from other part specifications. System 49 is constructed and arranged to move the induction coil assembly 48 in and out in the direction of arrow 50. Coil assembly 48 is also securely mounted to an X-drive system 51 which is controlled by servodrive circuitry and programmed in a manner similar to that utilized for the Y-drive system 49. System 51 is constructed and arranged to move the induction coil assembly 48 side-to-side in the direction of arrow 52.

The X and Y drive systems 51 and 49 each incorporate servo ball screw tables which actually position the induction coil assembly 48. These two tables are mechanically connected to each other with a ninety (90) degree or right angle relationship as would be understood and expected for X and Y drives. As explained, the crankshaft 21 is in effect mounted on centers 22 and 23 and rotated. In actual practice the upper center 22 takes the form of a chuck 40b. A servomotor (electric current spindle motor) 44 is used to drive the crankshaft and provides rotation data and pin position data to a computer control which is operably connected to the X and Y drive systems 51 and 49. Location data regarding the position of the corresponding pin 27a which is to be inductively heated and quench hardened is fed into the computer control which utilizes a data base program to move the induction coil assembly 48 in a tracking orbit which follows the particular orbit for the particular pin. The computer control program controls the X and Y drive systems and specifically the corresponding servo ball screw tables that position the coil assembly.

Each pin has a particular circumferential location relative to the longitudinal axis of the crankshaft 21. These pin locations coincide with the firing sequence for the cylinders of the engine. While the orbit of each pin is circular and while each orbit is of the same size, the actual location of a particular pin within its circular orbit at any instant of time depends on which pin is being considered and the corresponding cylinder. Accordingly, as the servomotor 44 provides positional data regarding the rotational status of the crankshaft, it is possible to compute a precise and corresponding pin location for each pin 27a–27d of the crankshaft, given that the pin dimensions and angularity are known from crankshaft part specifications and/or crankshaft blueprints or CAD drawings. With this data, it is thus possible to create a tracking orbital path for the induction coil assembly 48 relative to each pin.

Figure 7:
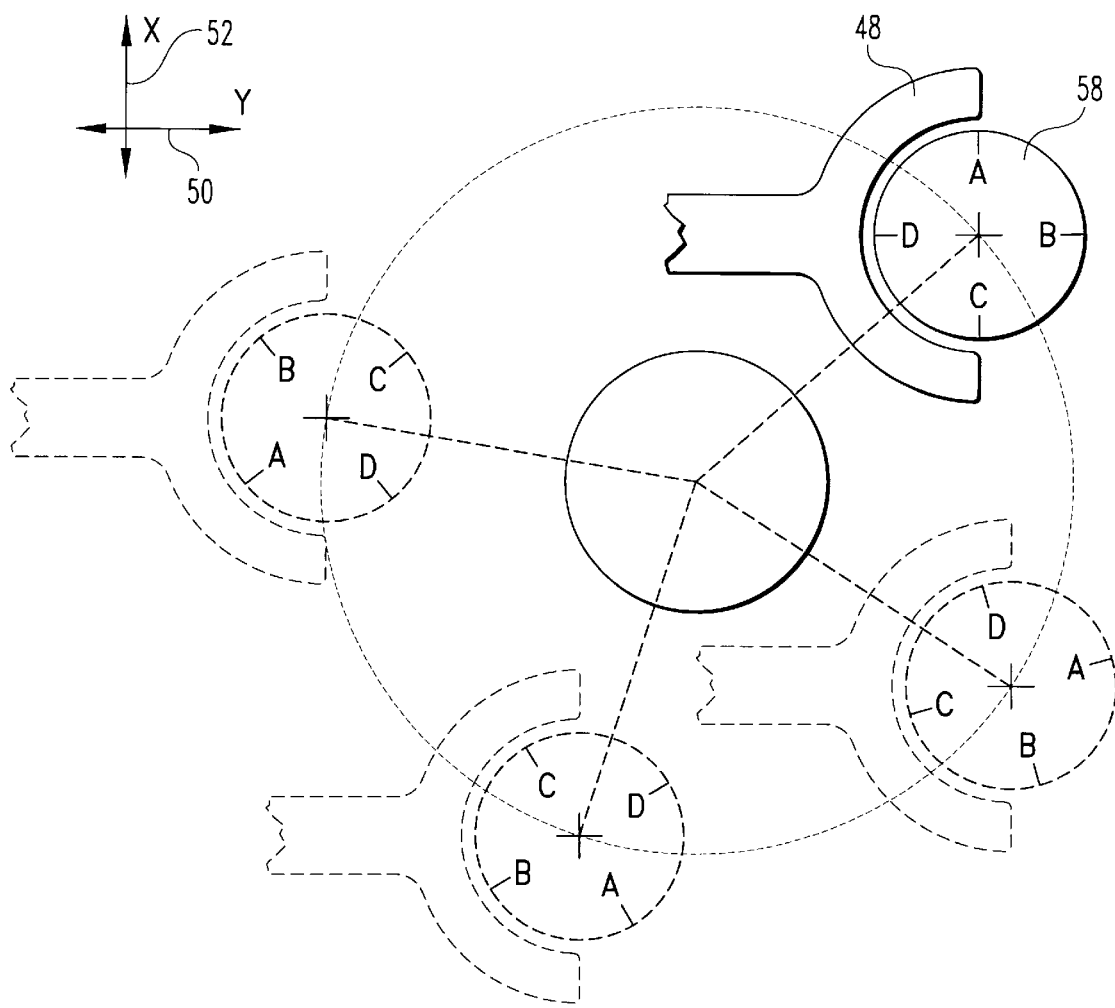
FIG. 7 is a diagrammatic illustration of the orientation of a crankshaft pin during one revolution of the crankshaft.

In the first embodiment of the present invention, the drive systems for the induction coil assembly are programmed to move the coil assembly in an orbit or track which precisely traces or copies the orbit path of the pin which is being induction hardened. This precise tracking by the coil assembly positions the semicylindrical inside surface of the coil portion at a fixed distance of separation (see FIG. 7) relative to the outside diameter surface of the pin.

Figure 6:
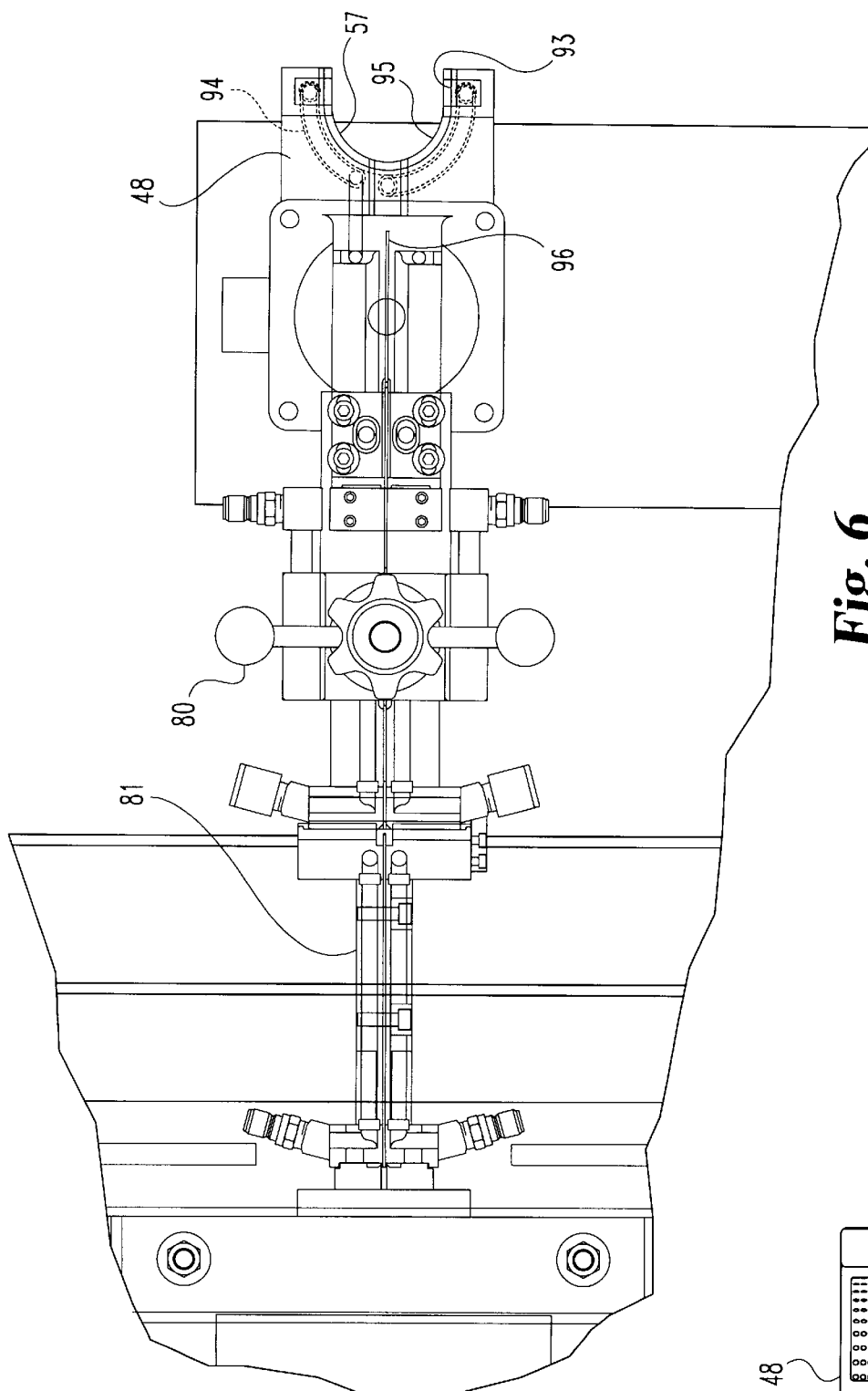
FIG. 6 is an enlarged top plan view of the induction coil at a first workstation comprising a portion of the FIG. 1 induction hardening apparatus.

According to the present invention, the induction coil portion of the coil assembly 48 has a part-circular, semicylindrical shape (see FIG. 6). The inner surface 57 is shaped so as to match the shape of each crankshaft pin, which is cylindrical. By creating coil assembly 48 with one side open, the coil is able to fit around a portion of each crankshaft pin. As the particular pin rotates with the crankshaft, its entire circumference ultimately is placed directly adjacent to the inner surface 57. This positional relationship is diagrammatically illustrated in FIG. 7. Four points A, B, C, and D, located ninety (90) degrees apart have been identified on the surface of cylindrical pin 58 in order to be able to show how these points shift relative to the X and Y directions for the induction coil assembly 48 as represented by arrows 52 and 50, respectively. The description of what occurs at the first workstation 33 of apparatus 20 is duplicated at the second workstation 36 of apparatus 20 when the second workstation is configured for induction hardening pins.

In those situations where counterweights are used and are connected adjacent the pins, there is a heat sink which draws heat away from the pin when the coil assembly is facing that portion of the pin which is closest to the counterweight. As would be understood for an induction hardening apparatus of the type described herein, the heated portion of the pin, or bearing surface, is localized and is that portion which is closest to the semicylindrical inner surface 57 of the coil portion. Consequently, when the coil portion is opposite to the counterweight, there is no noticeable heat sink loss which needs to be addressed by some form adjustment.

In the related embodiments of the present invention, the form of adjustment to compensate for heat loss takes three different forms. In one embodiment of the present invention (see FIG. 7A), the rotation of the crankshaft is varied (accelerate and/or decelerate) in each revolution so that there is a brief dwell or slowing of the rotation rate when the coil portion is adjacent the heat sink portion (i.e. counterweight 58a) of the pin. This dwell generates more heat which compensates for the heat which is lost due to the mass of the counterweights conducting heat away from the subject area.

Figure 7A:
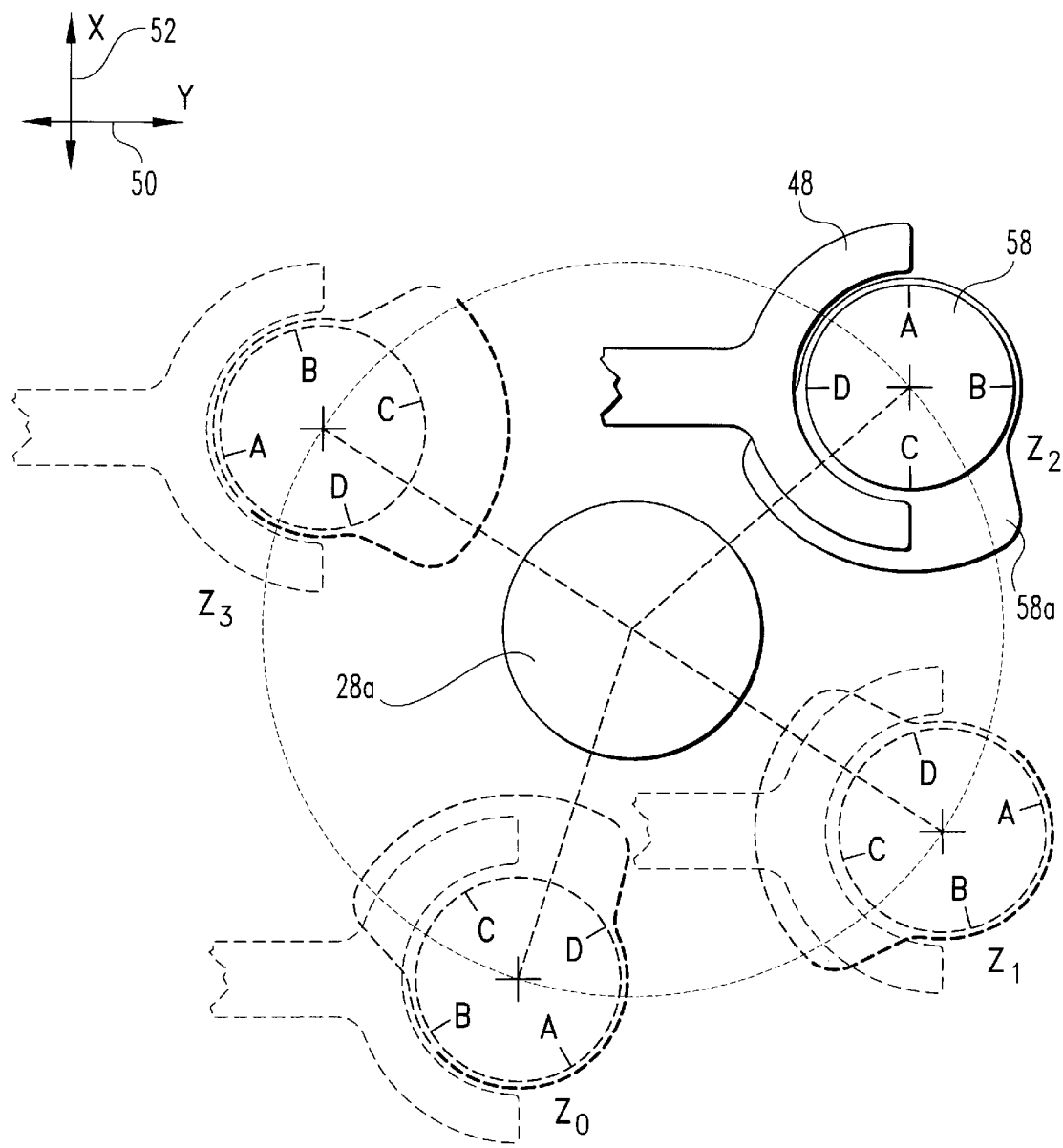
FIG. 7A is a diagrammatic illustration of the orientation of a crankshaft counterweight during one revolution of the crankshaft according to one embodiment of the present invention.

In the FIG. 7A drawing, the location of the counterweight 58a relative to coil assembly 48 is illustrated in four different positions (Z0–Z3) during one cycle which corresponds to one revolution of the crankshaft. As described the speed of rotation ($S_R$) of the crankshaft is varied depending on the counterweight location ($Z_N$) relative to the coil portion of the coil assembly. The coil assembly 48 is diagrammatically illustrated by a semicylindrical coil portion. In the Z1 position, when the coil portion is effectively centered on the counterweight 58a, the speed of rotation ($S_{R1}$) will be the minimum of the entire cycle. This causes the coil portion to remain adjacent this portion of the pin for a longer interval so that more heat is input to the pin. When the coil portion and counterweight 58a are on opposite sides of the pin 58, the $Z_3$ position, the speed of rotation ($S_{R3}$) is at the maximum for the cycle (i.e., one revolution of the crankshaft). This means that the heating interval will be shorter which is appropriate since the counterweight 58a is not going to draw off any significant amount of heat from the pin. In between these two speed extremes, the speed of rotation accelerates and decelerates. The acceleration line from Z1 to Z3 coincides with the deceleration line from Z3 to Z1.

In another embodiment of the present invention, (see FIG. 7B), the coil assembly distance of separation relative to the pin surface is varied or changed slightly during each cycle (i.e., each revolution of the crankshaft). When the coil assembly is on the counterweight side of the pin, it is placed closer to the pin than when the counterweight is on the opposite side of the pin from the coil. By placing the coil portion closer, the heat generated by the coil assembly into the pin is greater at the closer distance. This approach requires that the X and Y drive systems for the coil assembly be controlled so as to sweep a path which is more elliptical than circular.

Figure 7B:
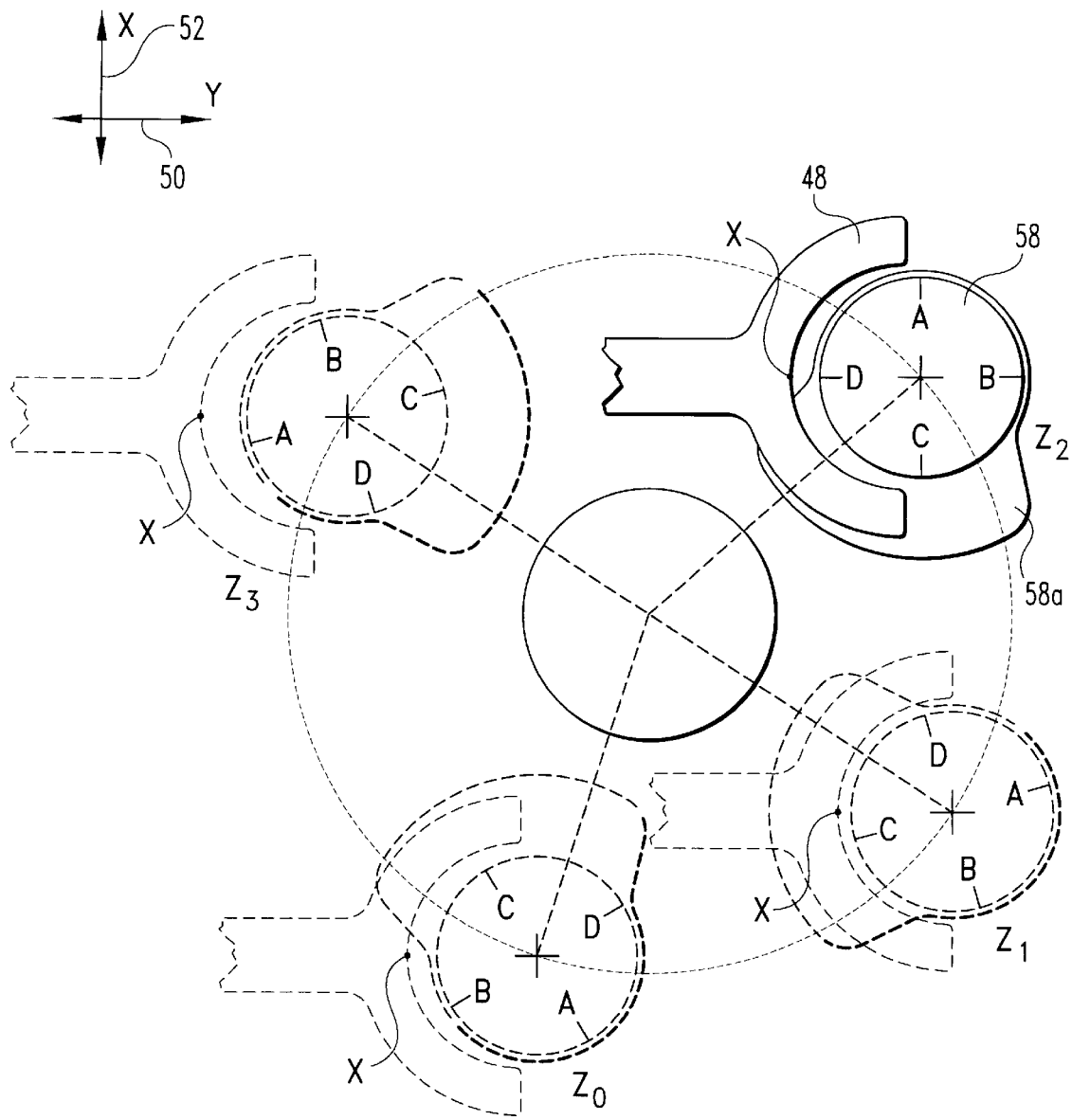
FIG. 7B is a diagrammatic illustration of the orientation of a crankshaft counterweight and the induction coil assembly during one revolution of the crankshaft according to one embodiment of the present invention.

In the FIG. 7B drawing, the location of the counterweight 58a relative to the coil assembly 48 is illustrated in four different positions (Z0–Z3) during one cycle. The positions of FIG. 7B correspond generally to the positions of FIG. 7A. At the Z1 position, the coil portion is at its closest to the pin which generates the greatest amount of heat which compensates for the heat which is lost due to the counterweight acting as a heat sink. At the Z3 position which is 180° from the Z1 position, the coil portion is at its location of greatest separation from the pin. This is the position where the counterweight has the least effect, if any, on the heat reduction due to the counterweight acting as a heat sink.

As the crankshaft rotates and the pin 58 moves through position Z2 from Z1 to Z3, the distance of separation between the inner surface 57 of the coil portion and the outside diameter surface of the pin increases. Then when returning from Z3 to Z1 through the Z0 position, the distance of separation decreases.

If a point (X) is marked on the coil portion and its path is traced for one cycle, it will be seen that the tracking orbit is elliptical rather than circular.

In a still further embodiment of the present invention, the path of the coil portion of the coil assembly is circular, the rate of rotation is constant, and the separation distance remains constant. However, the power output (kW) of the power supply for the coil assembly is varied depending on the position of the crankshaft and accordingly depending on where the coil portion is positioned relative to the orientation of the pin and the counterweight location. The FIG. 7A drawing is suitable to diagrammatically illustrate the rotation of the pin and counterweight when the power output is varied. In the Z1 position, the power output is the greatest due to the counterweight location. In the Z3 position, the power output is the lowest due to the counterweight location. The power output decreases from Z1 to Z3 and then increases from Z3 to Z1. Whenever the coil is adjacent the counterweight side of the pin, the power output is increased so as to generate more heat and thereby compensate for the heat which is lost via the counterweight.

It is important to understand that the adjustments which are made by these alternative embodiments are all achievable with the same basic mechanical and electrical structures associated with apparatus 20. All of the adjustments are effected by changing the speed programming of the spindle motor and the tracking speed of the X and Y drive systems or by changing the X and Y travel to vary the spacing or by changing the power output from the power supply.

One important feature of the present invention is that the induction coil assembly is free of any direct physical contact with the crankshaft pin which is being inductively heated and quench hardened. The induction coil assembly is also free of any direct physical contract with all other orbiting features. Likewise, at the second apparatus, the corresponding induction coil assembly is free of any direct physical contact with the crankshaft bearing surface which is being inductively heated and quench hardened. This lack of any contact includes the lack of any sensor or position indicator riding on the surface of the corresponding pin or bearing surface. In this way the coil assembly is not subjected to wear which would significantly reduce or shorten the coil life. By designing an apparatus where there is no contact between the coil portion of the assembly and the surface or portion being induction hardened, coil portion wear is virtually eliminated and coil portion life is noticeably extended. Likewise, since all other portions of the induction coil assembly are free of any contact with the crankshaft portion being induction hardened, there is no wear to these portions and no shortened life. Some of the keys to the success of the present invention include the precise programming of the X and Y movement of the coil, based on the pin orbit and the open, semicylindrical design of the coil portion of the coil assembly. While a vertical crankshaft orientation is preferred, the suitability of the present invention is not limited to a vertical crankshaft. The present invention performs equally well for crankshafts which are horizontally supported between centers.

With continued reference to FIGS. 1, 2, 3, 4, 5, and 6, some of the standard system components associated with each apparatus are illustrated. Induction hardening apparatus 20 includes for the first workstation 33 a 300 kW/10 kHz inductive power supply 67 and a compound precision horizontal slide 68 providing the X and Y drive systems 51 and 49, respectively. Duplicate equipment is provided for the second workstation 36 including inductive power supply 69 and horizontal slide 70. Slide 70 provides X and Y drive systems 61 and 62. Each workstation 33 and 36 also includes a heat station transformer 72 and transformer housing 72a. Enclosures 34 and 73 are provided to enclose the crankshafts and coils at each workstation. Apparatus 20 includes certain components and systems which interface with both workstations including human/machine interface 75, various pneumatics and controls 76, a main control enclosure 77, positioning control enclosure 77a, and a fluids system 78. Also included is a quench filter 79, quick change device 80 for each coil assembly, and bus bar 81. The main control enclosure 77 includes the computer and PLC controls, logic circuitry, running controls, breakers, and input/output circuitry for the apparatus. Enclosure 77a includes the circuitry for the positioning control devices.

With specific reference to FIG. 2, an 800 gallon quench water tank 82 is flow coupled to two 15 HP quench pumps 83 and 84. Pump 83 is coupled by a flow line to the first workstation 33 while pump 84 is coupled to the second workstation 36. Return lines 85 and 86 return the quench water which is used at each workstation and collected back into the quench water tank 82. Distilled water tank 87 contains a supply of distilled water for cooling of the electrical components. Pump 88 is used to deliver distilled water from tank 87. Pump 89 is a recirculating pump for cooling purposes only. Each induction coil assembly 48 and 63, in one embodiment of the present invention, is configured with a series of flow openings positioned around its inner surface for the rapid delivery of quench water to the inductively heated portions of the crankshaft, whether those portions include a pin or bearing surface (see FIG. 6A). By configuring the coil assemblies with a quench capability, there is no need to move the induction coil assembly and either position the crankshaft at a quench station or move a separate quench system into position. The combining of the inductive heating and quench hardening steps in a single coil assembly is one option for the present invention. Additionally, the use of a separate quench system is contemplated as a very viable part of the present invention due to the availability of excellent quench system technology. The use of a separate quench system is beneficial whenever the coil assembly design is to be simplified or when there is a desire to shorten the cycle time.

As has been described, the quench capability or function is performed in one embodiment of the present invention by flow holes machined directly into the induction coil assembly. These flow holes are connected to flow lines which are connected to the corresponding quench pump, see FIG. 2. In the alternative embodiment when a separate quench mechanism is used, the same flow lines are connected to the quench mechanism.

The actual quench step is preferably performed in stages. The first stage is while the crankshaft is still rotating immediately after the pin or bearing surface has been raised to the desired temperature. When a secondary or supplemental quench is performed, this occurs at a different Z-axis location and requires a vertical shift of the crankshaft. While the supplemental quench is being performed, the next pin is able to be positioned relative to the induction coil assembly for processing. This doubling up of different functions helps to reduce the overall cycle time for the crankshaft.

Once the crankshaft is vertically supported between centers at the first workstation 33, the induction coil assembly 48 is moved into position and as the crankshaft rotates, the coil assembly 48 generally tracks the orbit of the selected pin at the same rate and inductively heats the pin. This heating step takes approximately 10–20 seconds. Once the pin of the crankshaft is heated to the desired temperature, the quench step needs to be performed. This is achieved in one embodiment by a surge of quench water through the coil assembly and directly onto the pin which has been heated (see FIG. 6A). In another embodiment of the present invention, the coil assembly is disengaged and the crankshaft continues to rotate while a separate quench station is operated. The crankshaft continues to rotate while the quench step is being performed regardless of the embodiment. Once the induction hardening of this first pin is completed, the crankshaft is vertically indexed while the coil assembly remains fixed in order to position to the next pin of the crankshaft. This procedure is repeated until all of the pins of the crankshaft have been inductively heated and quench hardened. The drive systems for the coil assembly are programmed to recognize which pin is selected and the X and Y drive systems are programmed to trace a preselected orbit for that particular pin. Since various embodiments have been described, it must be determined whether any counterweight adjustment is desired and, if so, which type of adjustment will be made. The X and Y travel of the coil assembly is still the same for each pin, once the starting position is determined. Each pin has a different circumferential location relative to the rotary position of the crankshaft and thus the starting position of the coil assembly varies depending on the selected pin.

The induction coil assembly 48 at the first workstation 33 is initially positioned relative to the selected pin prior to rotation of the crankshaft. Accordingly the X-Y tracking path for the coil assembly of the pin orbit needs to have a tracking speed which is synchronized with the speed of the crank-shaft. The speed and path of the coil assembly are critical and must precisely match the speed of the crankshaft and the orbit of the pin. Even when the spacing between the coil assembly and the pin varies, there is still a specific tracking orbit which is traced each cycle. This is not a concern for the bearing surfaces due to the coaxial nature of their orbit.

As has been explained, the induction hardening of the crankshaft pins can be completed prior to the induction hardening of the bearing surfaces or after the induction hardening of all bearing surfaces. The pins and bearing surfaces can be processed at two different workstations as part of one apparatus or by two separate apparata, one dedicated to pins and the other dedicated to bearing surfaces.

Figure 6A:
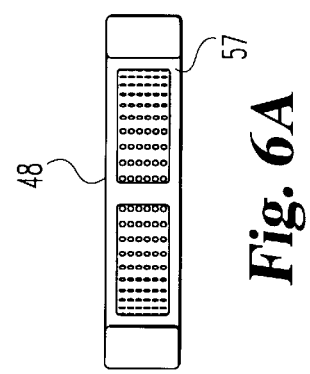
FIG. 6A is a front elevational view of the FIG. 6 induction coil assembly.

As illustrated in FIGS. 5 and 6, a typical coil assembly includes a copper heating element (inductor) 93, an internal cooling jacket 94, a field focusing portion 95 of iron suspended plastic material, isolation spacer 96, and a locator block 97. The field focusing portion is used to manipulate the magnetic flux field. When the quench capability is built into the coil assembly, the inner surface 57 is provided with a plurality of holes in a compact and uniform pattern as illustrated in FIG. 6A. When the quench function is performed by a separate quench mechanism, the quench mechanism is located between the ends of the crankshaft on a positioning mechanism (not illustrated) as is well known in the art.

Figure 8A:
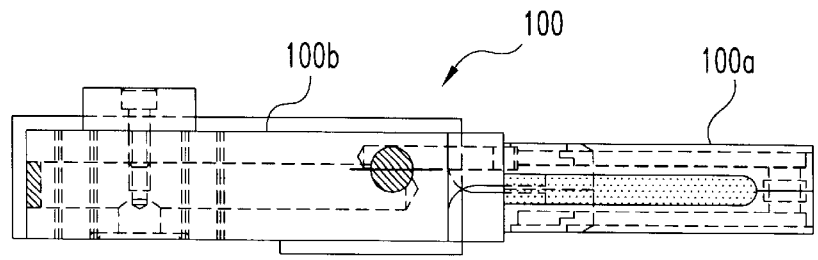
FIG. 8A is a side elevational view of the FIG. 8 induction hardening coil assembly.
Figure 8:
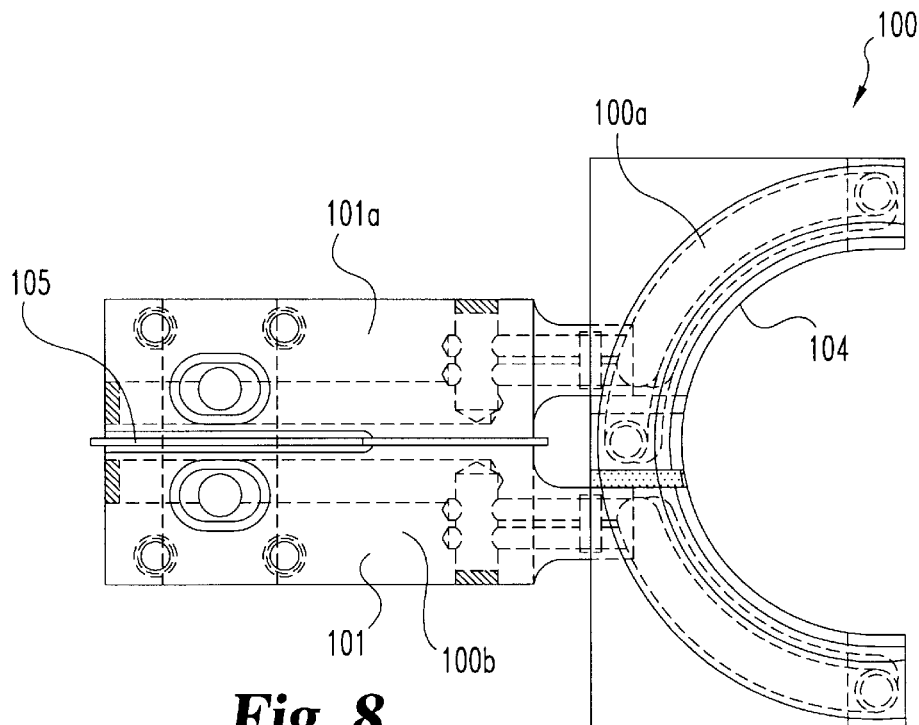
FIG. 8 is a top plan view of a 90 degree induction hardening coil assembly which is suitable for use with the present invention.
Figure 9:
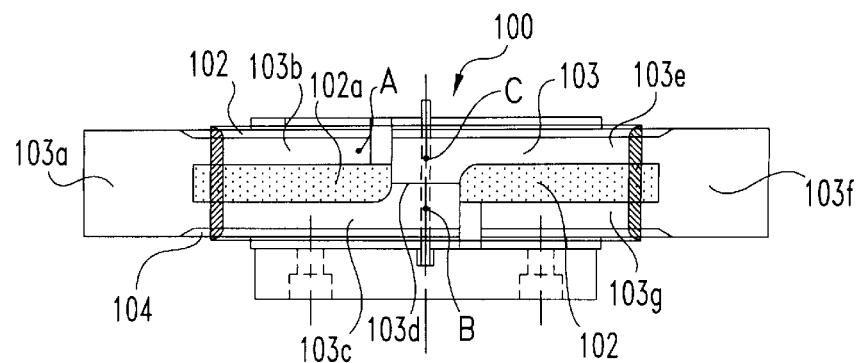
FIG. 9 is a front elevational view of the FIG. 8 induction hardening coil assembly.

With reference to FIGS. 8, 8A, and 9, a 90 degree coil assembly 100 is illustrated. Coil assembly 100 includes coil 100a and support arm 100b. Support arm 100b is constructed with a current-in portion 101 and a current-out portion 101a. These two portions are electrically insulated from each other and are in effect staggered top to bottom one from the other with regard to the ends which connect to the coil 100a. Portions 102 of an electrical insulator material is layered around and between portions 103 of copper conductor material. The electrical continuity path for the incoming current begins with the connected transformer and travels to coil 100a by way of portion 101. The electrical continuity path is described in the context of how the current travels through this continuity path. At the coil, the current then travels approximately 90 degrees around the exposed surface 104 of coil 100a from point A to the upper part of portion 103a. The return path is from the lower part of portion 103a back to point B. The return path is also approximately 90 degrees. This 90 degree path is the basis for describing coil assembly 100 as a 90 degree coil.

As used herein, expressions such as the following "90 degree coil", "90 degree induction coil", and "90 degree coil construction" each refer to an induction coil which has a generally semicylindrical opening and a support arm which conducts the current to and from the coil. The support arm is positioned relative to the semicylindrical opening such that it is effectively centered and in this fashion there is an approximate 90 degree portion of the coil opening extending away from one side of the support arm in a first direction and another approximate 90 degree portion of the coil opening extending away from the other (opposite) side of the support arm in a second direction. This construction is clearly illustrated in FIG. 8 and the "90 degree" reference refers to the current travel from the support arm to one end or edge of the semicylindrical opening.

Portions 103b and 103c are insulated by portion 102a of the electrical insulator material. Portion 103d, which includes point B, is centered on the centerline of support arm 100b and on the centerline of coil 100a. The centerline of support arm 100b is also coincident with the centerline of insulator strip 105 which is positioned between portion 101 and portion 101a.

The current flow through portion 103d is from lower point B to upper point C. At point C, the next (second) 90 degree current path begins. This flow path is from point C through portion 103e to portion 103f, along the exposed surface 104. At this point, the current path travels down through portion 103f to portion 103g. The exit from portion 103g is back to the current-out portion 101a of support arm 100b.

The construction of coil assembly 100, as illustrated in FIGS. 8, 8A, and 9, is capable of including a water quench capability by providing quench apertures according to what is illustrated in FIG. 6A into surface 104 of coil 100a. Communicating with these quench apertures are cooperating passageways which are formed on the interior of coil 100a. These quench apertures are not illustrated in FIG. 9 simply for drawing clarity in order to be able to clearly illustrate the conductive and non-conductive portions and the corresponding current paths.

The style of coil assembly 100, as illustrated in FIGS. 8, 8A, and 9, is suitable for use in the illustrated embodiments of FIGS. 1, 2, 3, 4, 5, and 6 and for the induction hardening of the workpieces which are processed by those illustrated embodiments. However, it has been learned that an alternative style of coil assembly (180 degrees) is preferred for the induction hardening of selected portions of certain workpieces, such as crankshafts.

Figure 10:
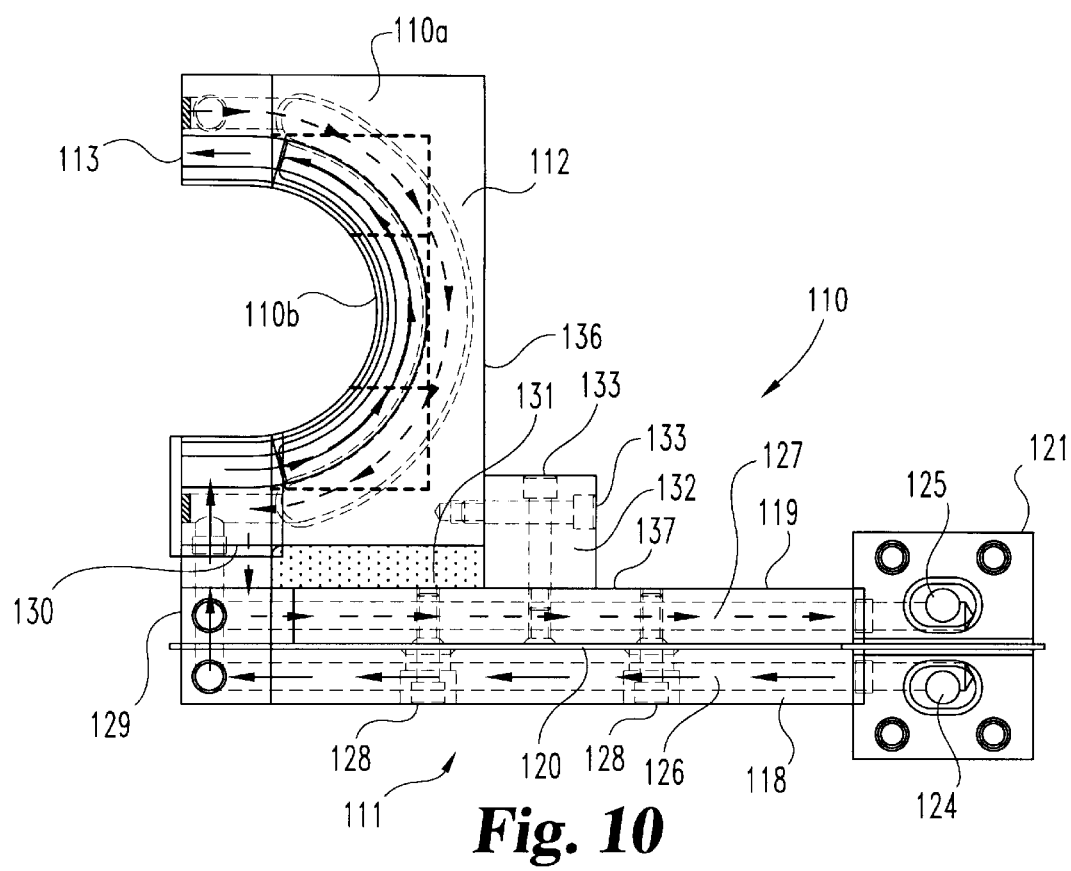
FIG. 10 is a diagrammatic, top plan view of an offset, 180 degree induction hardening coil assembly according to the present invention.
Figure 11:
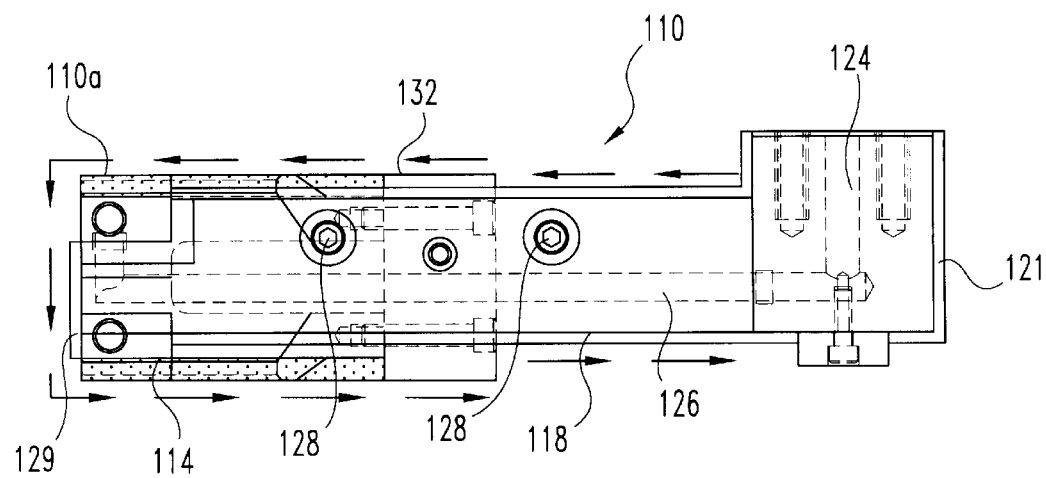
FIG. 11 is a diagrammatic, side elevational view of the FIG. 10 coil assembly.
Figure 12:
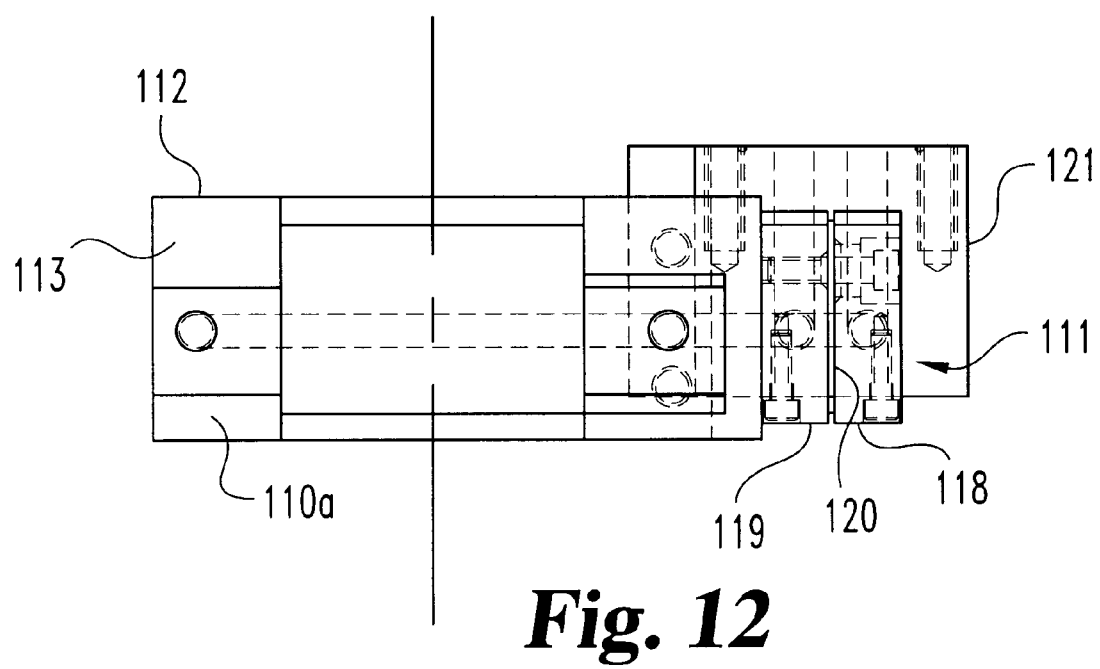
FIG. 12 is a diagrammatic, front elevational view of the FIG. 10 coil assembly.

The alternative style (i.e., "offset") of coil assembly 110 is illustrated in FIGS. 10, 11, and 12. The 180 degree description and the reference to the "offset" style for coil assembly 110 comes from the fact that the connecting support arm 111 is positioned along one side of the actual coil 110a such that the current flow travels in an approximate 180 degree continuity path across the top surface 112 of the coil 110a before traveling down the front surface 113 and returning 180 degrees across the underside surface 114 back to the support arm 111. The current flow (continuity) path for coil assembly 110 is illustrated by arrows 115. It will be understood that, as between the 90 degree coil style and the 180 degree coil style, the 90 degree coil assembly style is closer to the state of the art or the industry standard. Accordingly, it should be understood that the 180 degree offset style of coil assembly 110, as described herein, is a unique and novel design and a departure from the industry standard. The reference to "offset" in describing coil assembly 110 comes from the support arm location which is offset from center. The construction details of coil assembly 110, including coil 110a and support arm 111, are illustrated in FIGS. 10, 11, and 12 and are described hereinafter. Some of the basic construction details of coil assembly 110 follow the well-known design principles for induction hardening coils. The focus of the uniqueness and novelty of coil assembly 110 is on the specific configuration of coil 110a and importantly on the corresponding current flow path including the 180 degrees of travel around the coil as has been described.

As used herein, the expressions such as "offset 180 degree coil", "offset 180 degree induction coil", and "180 degree offset style of coil" each refer to an induction coil which has a generally semicylindrical opening and a support arm which conducts the current to and from the coil. The support arm is connected to the coil along one side of the coil such that the entire approximate 180 degrees of the semicylindrical coil opening extends away from the support arm. In this fashion, the current which is delivered to and from the coil by means of the support arm, travels from the support arm to the opposite end of the coil, approximately 180 degrees, and then returns to the support arm. This style of induction coil is described as being "offset" because the support arm is not centered relative to the coil but is actually offset to one side of the entire coil. This construction is clearly illustrated in FIG. 10.

With continued reference to FIGS. 10, 11, and 12, the support arm 111 is configured with two conductive portions 118 and 119 (one positive, one negative) which are separated and electrically insulated (and isolated) by insulator panel 120. Connection block 121 is designed to be mechanically and electrically connected to an electrical bus bar (not illustrated) which is operably connected to a transformer (not illustrated). Block 121 is mechanically and electrically connected to each of the two conductive portions 118 and 119. The heating current flows in from the transformer across one conductive portion 118 and back to the transformer by way of the other conductive portion 119. Disposed in block 121 are two water passageways 124 and 125 and each conductive portion includes a corresponding and connecting passageway 126 and 127. Passageway 126 in portion 118 is in flow communication with passageway 124. Passageway 127 in portion 119 is in flow communication with passageway 125.

Figure 18:
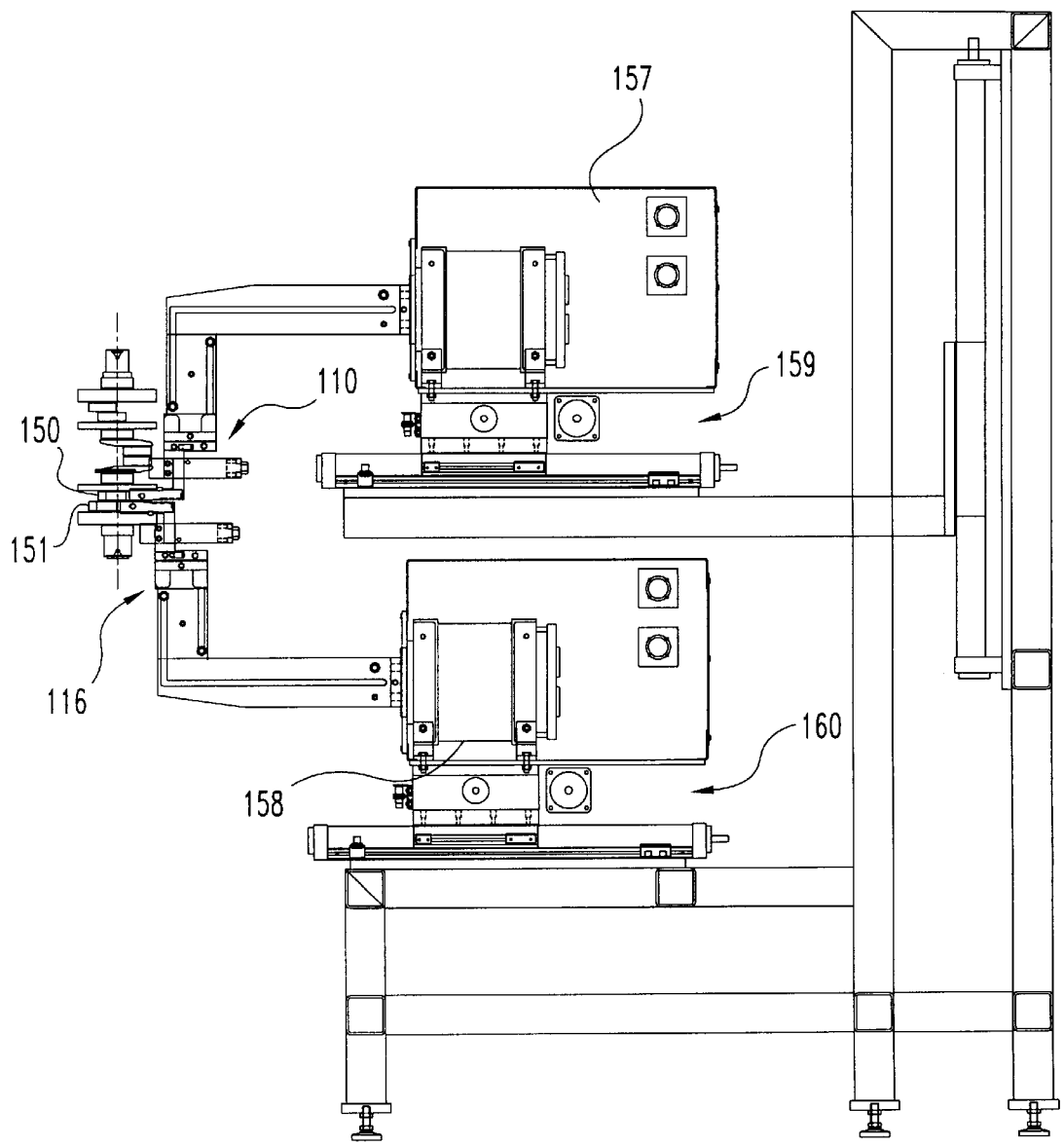
FIG. 18 is a side elevational view of two induction hardening arrangements including transformers for the use of two coil assemblies.

In the context of FIG. 18, to be described in greater detail hereinafter, two offset style of coil assemblies are used for a split pin pair, also as described herein. When using two offset coil assemblies in this manner, there are two primary design options. One option is to use two coil assemblies 110, without any design modifications. In order to have adequate clearance space around the crankshaft and in order to be able to connect to the corresponding transformers, the two corresponding connections blocks 121 extend in opposite axial directions and are connected on opposite sides of the crankshaft.

Figure 18A:
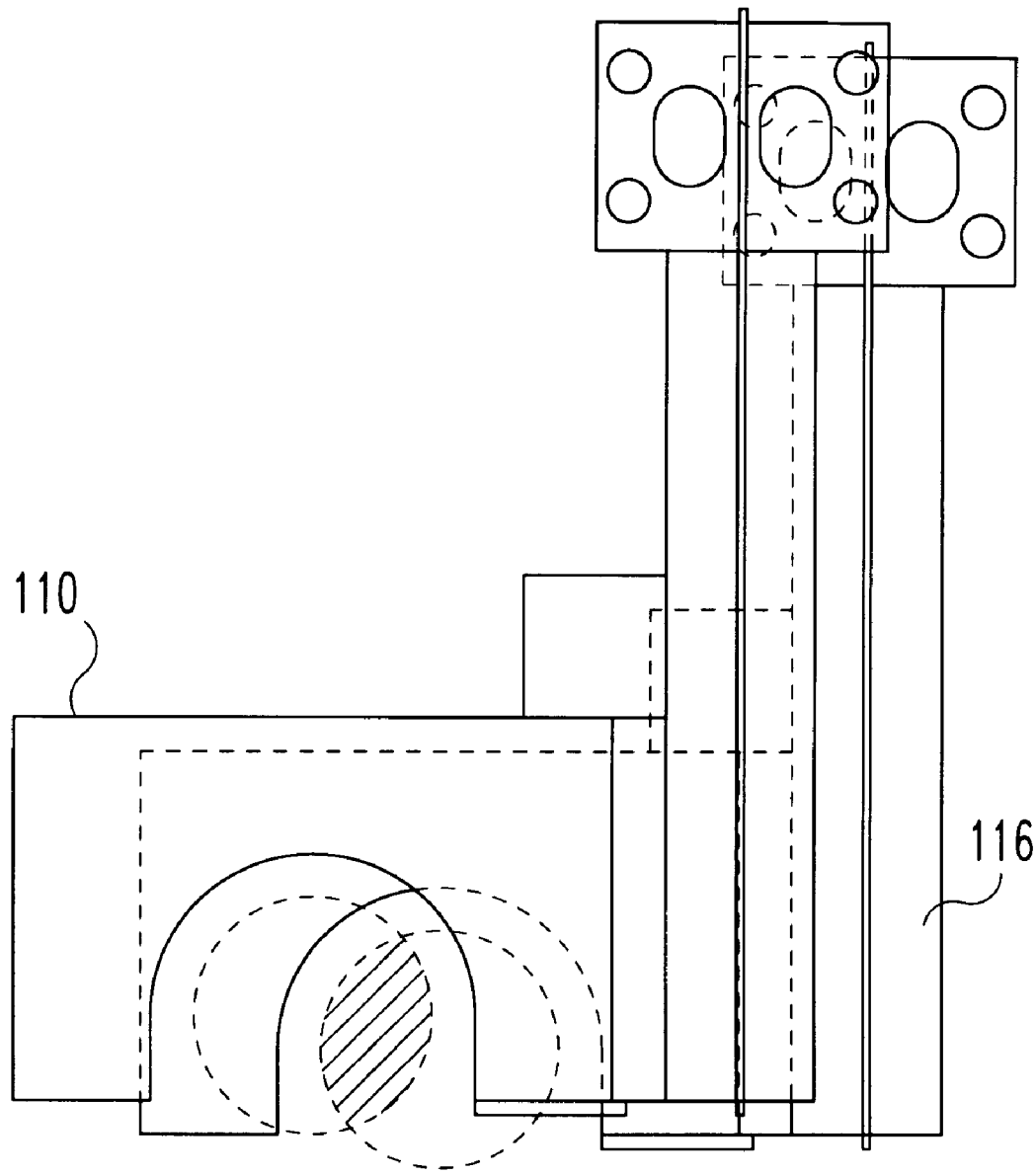
FIG. 18A is a diagrammatic, top plan view of one FIG. 10 coil assembly in combination with a modified FIG. 10 coil assembly as arranged in the FIG. 18 assembly.
Figure 18B:
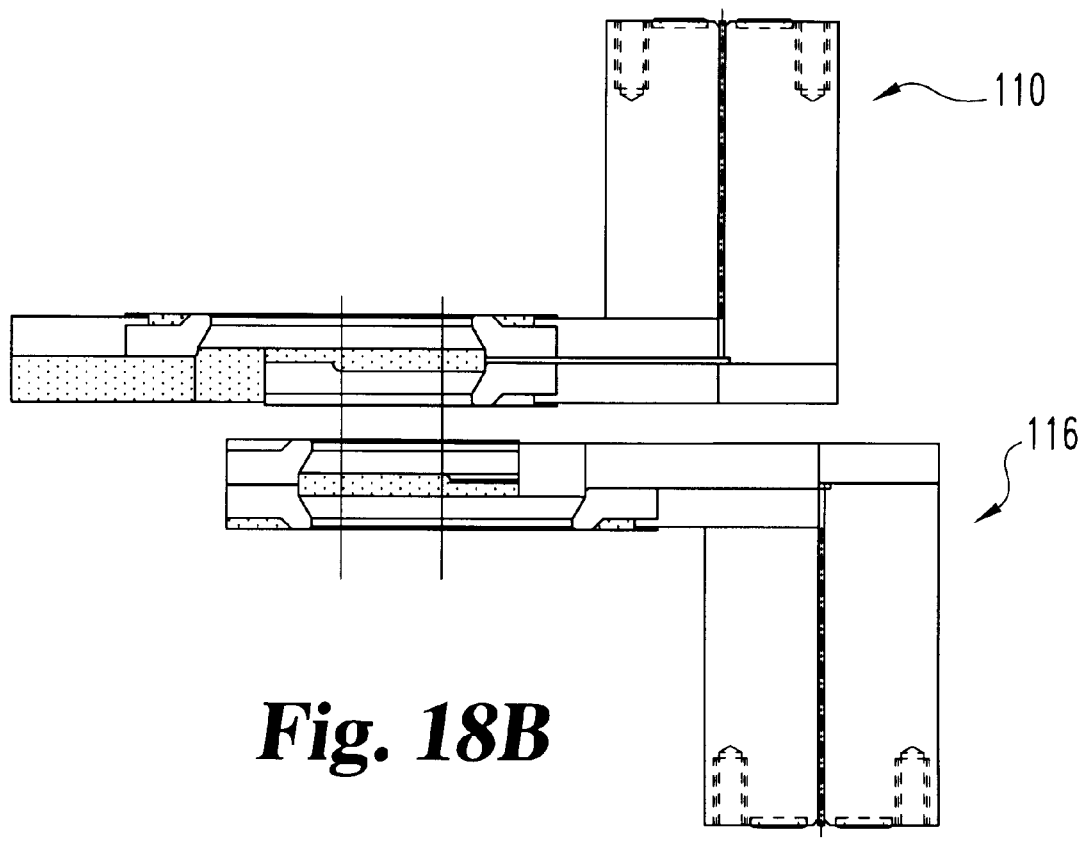
FIG. 18B is a diagrammatic, front elevational view of the two FIG. 18A coil assemblies.

Another option is to use one coil assembly 110 and a slightly modified coil assembly 116 (see FIGS. 18, 18A, and 18B). The "modification" to coil assembly 110 in order to create coil assembly 116 is to reverse the direction (axial) of the connection block 121 from one side of conductive portions 118 and 119 to the opposite side. With this modification, one coil assembly 110 is used in combination with one coil assembly 116. Their corresponding connection blocks extend in opposite (axial) directions, but are now on the same side of the crankshaft and generally aligned (axially) with each other, except for the shift required in order to align with the two split pins (see FIGS. 18A and 18B).

With continued reference to FIGS. 10, 11, and 12, threaded fasteners 128 are used to help connect the two conductive portions 118 and 119 together and to mechanically sandwich and secure the insulator panel 120 between the two conductive portions. The end 129 of the support arm 111 (i.e., the assembly of the two conductive portions 118, 119, in combination with the insulator panel 120) is connected to one side 130 of the 180 degree coil 110a. Insulator 131 limits the electrical connection of the support arm 111 to the coil 110a to the localized area of end 129. Block 132 is used as a brace to secure and strengthen the connection of the support arm 111 to the coil 110a. Threaded fasteners 133 are used to attach block 132 to the rear surface 136 of coil 110a and to the longitudinal side 137 of portion 119.

The incoming current flow travels across portion 118, turns the corner at end 129, and flows approximately 180 degrees across the top surface 112 of coil 110a. The current flow path then follows the front surface 113 and flows to the underside surface 114. At this point the current flows 180 degrees back around coil 110a to portion 119, and from there along the underside of portion 119 back to block 121. The heating dynamics of this current flow path for the 180 degree offset coil assembly 110 delivers power to the top edge and then the bottom edge and the center portion last. The current path across top surface 112 is in the shape of a semicircle of at least 180 degrees. The curvature of the path coincides with the curved and cylindrical geometry of the inner face 110b of coil 110a. Inner face 110b extends for at least 180 degrees and represents the surface which is adjacent to the portion of the workpiece to be induction hardened.

What has been learned by a comparison of the heating patterns and heat treating results between the 180 degree coil assembly and the 90 degree coil assembly is that the 90 degree coil assembly creates a heating dynamic which starts at the center area of the workpiece, in particular the selected portion of the workpiece, such as a pin of a crankshaft, before reaching the adjacent or outlying corners. In certain situations where heat treating of the corner portions is desired, the center portion will get too hot before the heat gradually reaches the corners. The cause-effect of this situation is due to the 90 degree current path and the fact that only one-fourth of the pin is heated at any one time (position) and the heat quantity is less for the fixed mass. In contrast, the 180 degree coil 110a has a current path which begins heating the corner portions first and then migrates to the center portion. It is worth noting that in the design of pins and inner mains of a crankshaft, the inside corners being discussed herein are locations of greater mass compared to the actual pin or main. By heating the locations of greater mass first, the heat can build up without overheating the portion of less mass.

Figure 13:
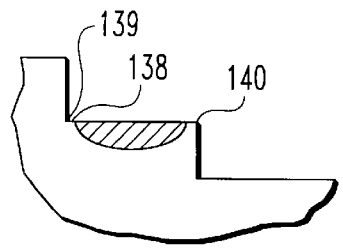
FIG. 13 is a partial, diagrammatic illustration of the resultant heating pattern in a workpiece based upon the style of coil assembly which is used.
Figure 14:
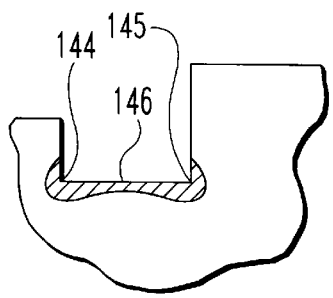
FIG. 14 is a partial, diagrammatic illustration of the resultant heating pattern in a workpiece based upon the style of coil assembly which is used.
Figure 15:
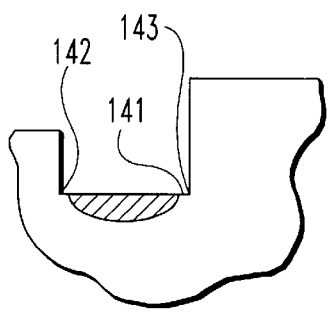
FIG. 15 is a partial, diagrammatic illustration of the resultant heating pattern in a workpiece based upon the style of coil assembly which is used.

In FIGS. 13, 14, and 15, the heating pattern (heat treating) results for different component portions are diagrammatically illustrated for the 90 degree coil assembly 100 and for the 180 degree coil assembly 110. The heating patterns (i.e., the shaded area) of FIG. 13 is for an outer main bearing 138 and the outer edges or corners 139, 140 do not represent critical areas from the perspective of higher hardness and strength requirements. Accordingly, either style of coil assembly 100 or 110 can be used for an outer main bearing.

When inner main bearings or pins are being hardened, the heat treating pattern needs to include the inside corners because corner strength is critical due to torsional loads. With the 90 degree coil assembly 100, the heating pattern (i.e., the shaded area) for an inner main bearing or pin 141 is illustrated in FIG. 15. As is illustrated, the interior corners 142, 143 do not receive sufficient heat treating in order to achieve the desired or necessary hardness and strength. In contrast, the heating pattern of FIG. 14 is achieved by the use of the 180 degree coil assembly 110. Here the interior corners 144, 145 on each side of the cylindrical inner main bearing (or pin) 146 are sufficiently heat treated to acquire the desired hardness and strength. As would be understood, the 90 degree coil assembly 100 is suitable to be used for the outer mains (No. 1 and No. 5), while the 180 degree coil assembly 110 should be used for the inner mains (Nos. 2, 3, and 4), for example. While the hardening patterns created by use of the 180 degree coil assembly are extremely important, there are other benefits derived from the use of the 180 degree coil assembly as compared to the 90 degree coil assembly. Using a crankshaft pin as an example, tests have shown that for a typical set up using the 90 degree coil assembly 100, it takes approximately 18 seconds to properly heat the pin for the desired heat treating condition. With the 180 degree coil assembly 110 under otherwise virtually identical conditions, it takes approximately 11 seconds to properly heat the pin for the desired heat treating condition. The time savings is directly related to the fact that by heating the locations of greatest mass first rather than last, time is not lost or wasted waiting for these locations to get up to the necessary temperature. Additionally, with the 180 degree coil 110a there is a greater area of mass for water cooling through the coil which in turn permits a greater heat capacity and greater power capability. The heating capacity of the 180 degree coil is effectively doubled in comparison to the 90 degree coil. The 180 degree coil is preferred over the 90 degree coil when less complexity is desired or when a greater or stronger electric field is desired. The 90 degree coil generates less power, uses less copper, and enables less fluid flow for cooling.

The heat treating patterns illustrated in FIGS. 13–15 are derived from microsectioning of actual parts which have been induction hardened using both 90 degree and 180 degree coil assemblies. It is the unique and important heat treating pattern of FIG. 14 which has been discovered as achievable by the use of the novel and unobvious 180 degree offset coil assembly 110 which has been illustrated and described herein.

The arrangement of main bearings, pins, and counterweights varies to some extent with the engine style. For example, an in-line six has three pairs of pins which can be heat treated (i.e., induction hardened) by pairs due to their identical location relative to a top dead center position. As would be understood, pins 3 and 4 can be processed together, concurrently, as can pins 2 and 5, as well as pins 1 and 6. In a V-6 engine, the six pins are grouped into three pairs in order to properly balance the V-6 engine. The two pins of each pair are adjacent to each other and are described as "split pins". This might be regarded as a more unique situation from the perspective of induction hardening, but the crankshaft for a V-6 engine is still a relatively common configuration.

Figure 16:
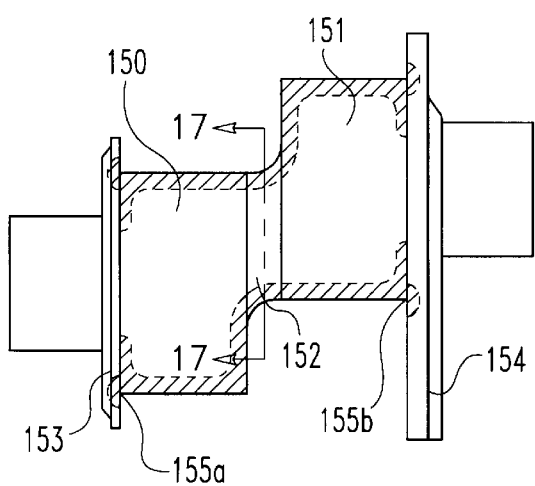
FIG. 16 is a partial, diagrammatic front elevational view of two adjacent pins of a vehicle crankshaft which have a "split-pin" design.
Figure 17:
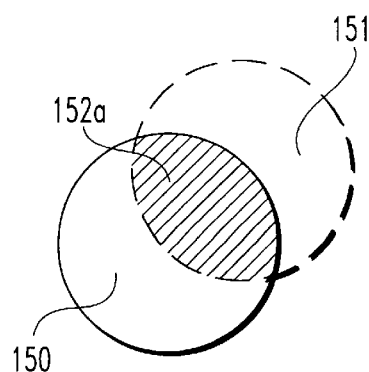
FIG. 17 is a diagrammatic illustration of the section view of the offset region between the two adjacent pins of FIG. 16.

A "split pin" pair of crankshaft pins 150 and 151 are diagrammatically illustrated in FIG. 16. These pins are rotatably shifted by an approximate 30 degree offset for proper balance of the V-6 engine. The region 152 disposed between the two pins 150 and 151 has inherent weakness because it is the thinnest section or portion of the crankshaft. FIG. 17 is a diagrammatic illustration of what region 152 looks like in lateral section due to the cylindrical nature of pins 150 and 151 and the fact that these two cylindrical pins are shifted relative to one another so that their cylindrical axes are not coincident. The sector shape 152a of region 152 through section 17—17 is referred to as a "football" or football-shape due to its geometry. Included as part of the partial crankshaft illustrated in FIG. 16 are counterweights 153 and 154. The heating (i.e., induction hardening) sequence begins with the radiused inside corners 155a and 155b. This is followed by the heating (i.e., induction hardening) of the journals (i.e., pins 150 and 151). Consistent with what has been described with the inside corners 144 and 145 of FIG. 14, the inside corners 155a and 155b are regions of greater mass. The 180 degree coil design generates more heat in this area, due in part to being heated first. The resultant heating pattern is also illustrated in FIG. 16.

Another option for controlling the amount of heat input into the crankshaft or other workpiece is to vary the rate of rotation of the crankshaft depending on the mass which is present adjacent the coil. When the induction hardening coil is adjacent the more narrow portion of the counterweight, for example, the rate of rotation is faster because less heat input is required. As the crankshaft rotates and the larger portion of the counterweight is brought into position adjacent the coil, the rate of rotation is slower so that more heat can be input.

According to the present invention, the preferred approach for the induction hardening of pins 150 and 151 is to use, concurrently, two 180 degree offset coil assemblies 110 and 116 (as previously explained, see FIG. 18A and 18B). Since there is an approximate 30 degree offset or shift, the two coil assemblies will have a similar shift or offset, one relative to the other, as diagrammatically illustrated in FIGS. 18A and 18B. By lining up the two coil assemblies on the two pins 150 and 151 of the crankshaft, the transition region 152 is not directly heated. Instead, the heating of the pins will conduct sufficient heat to region 152, considering the thinner mass of this region, to effect the desired induction hardening. Since there are three pairs of offset pins, the heating (induction hardening) described for pins 150 and 151 is basically the same for the other two pairs of pins. As illustrated in FIG. 18, one 180 degree offset coil assembly 110 is electrically and mechanically connected to a transformer 157 and the other 180 degree offset coil assembly 116 is electrically and mechanically connected to transformer 158. Each transformer is mounted onto its own corresponding X, Y positioning table 159 and 160.

The proximity of pins 150 and 151 presents an induction hardening challenge because the heating of one pin without the concurrent heating of the adjacent pin causes a tempering back of the edges of the adjacent pin. The proximity of the two pins is sufficiently close that the heat generated for the induction hardening of one pin is not able to be isolated from the adjacent pin in order to prevent the tempering back. If pins 150 and 151 are not induction hardened at the same time, the intermediate region 152, the connection portion between the two pins, remains a soft zone with insufficient hardness.

Figure 19:
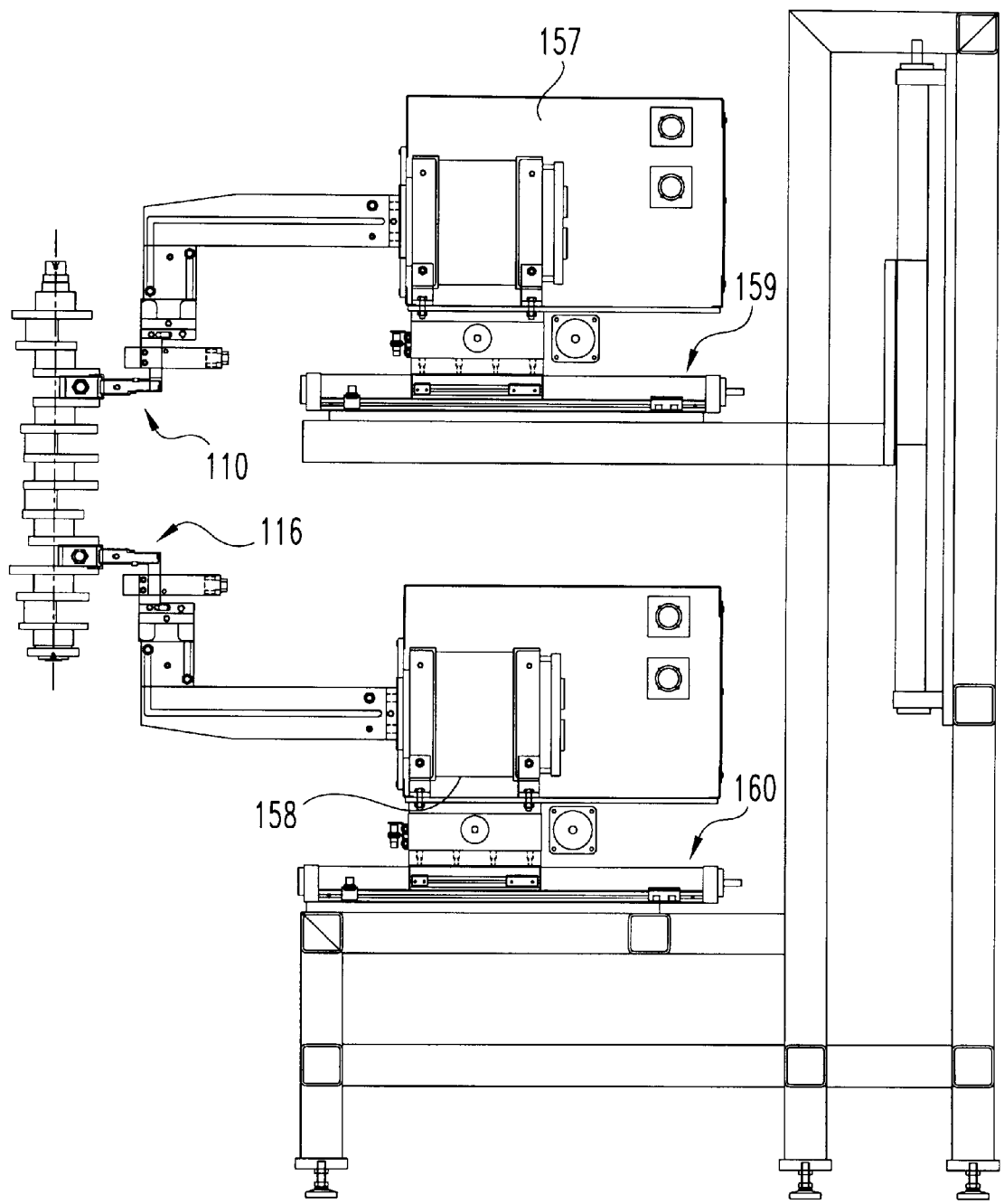
FIG. 19 is a side elevational view of two induction hardening arrangements including transformers for the use of two FIG. 10 coil assemblies.

The FIGS. 18A and 18B arrangement of the two offset coil assemblies 110 and 116 is illustrated for the induction hardening of split pins 150 and 151 as part of a V-6 engine crankshaft, as illustrated in FIG. 18. The shift or offset in the two pins 150 and 151 is translated into the positions of the two coil assemblies 110 and 116 as they are used together. The FIG. 19 illustration depicts the use of the two offset coil assemblies 110 and 116 for the induction hardening of an in-line 6 crankshaft. The only "difference" between the FIG. 18 and FIG. 19 illustrated arrangements is in the style or type of crankshaft being induction hardened.

Figure 20:
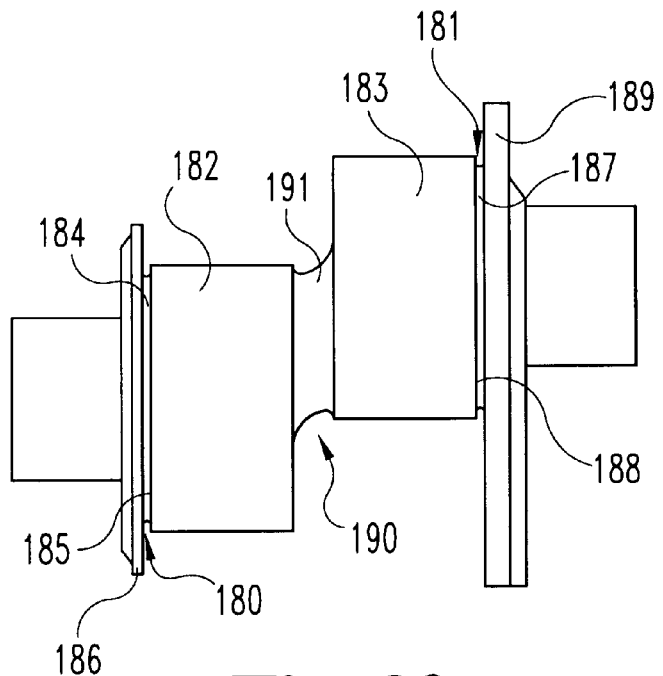
FIG. 20 is a partial, diagrammatic front elevational view of two adjacent pins of a vehicle crankshaft which have an undercut, split-pin design.

One of the design improvements for the split pin portion of the FIG. 16 crankshaft is to create undercuts which function as relief areas for the grinding operation for the corresponding pins. This design improvement for the configuration of a crankshaft is illustrated in FIG. 20. Undercuts 180 and 181 are located adjacent the outer end portions of pins 182 and 183, respectively. Undercut 180 provides an annular relief area 184 between the outer end portion 185 of pin 182 and counterweight 186. Undercut 181 provides an annular relief area 187 between the outer end portion 188 of pin 183 and counterweight 189. Undercut 190 provides an annular relief area 191 between the inner connecting end portions of pins 182 and 183.

By undercutting the pins 182 and 183 with the annular relief areas 184, 187, and 191, as illustrated, grinding of the pin surfaces becomes a less "damaging" operation in terms of the grinding wheels. It has been learned that when the outer surface of a pin directly contacts the inner wall of a contiguous counterweight, or other portion of the crankshaft, there is a greater risk of damage to the grinding wheels which are used in machining the outer surfaces of the pins. The same concern exists with the "football" region between the inner, facing surfaces of pins 182 and 183. By undercutting the pins on their opposite ends in order to create an annular relief area up against the corresponding counterweight surface and by providing a relief area between the two pins, the grinding wheel is not subject to the same risks of likely or potential damage.

While this redesign of the crankshaft is being disclosed and explained in the context of split pins, the same concerns exist for any single pin when placed up against the flat face of an adjacent surface which is normal to the axis of the pin and larger in diameter than the outside diameter of the pin.

The undercuts of the two pins of a split pin pair of a crankshaft, as described and illustrated herein, is believed to be a patentable improvement to the design of crankshafts generally due to the "savings" in terms of grinding wheels, whenever grinding wheels or similar machining tooling are used in the machining of the split pins.

As described in U.S. Pat. No. 6,013,904 and as repeated herein, the split pin configuration of FIG. 16 receives the illustrated heating pattern (shaded portions) by use of two 180 degree offset coil assemblies (see FIG. 18), with their own 30 degree offset or shift (see FIGS. 18A and 18B).

When undercuts 180 and 181 are made to the split pin pair, pins 182 and 183, as illustrated in FIG. 20, such that the two annular relief areas 184 and 187 are created, it will be seen that the outer diameter surface of each of the pins 182 and 183 in the area which was previously part of the heating pattern has been removed. While there is still a desire to create a heat treated area across and around the relief areas 184 and 187, by way of induction hardening of the split pin pair, the induction coil style needs to be changed. There is less mass in the area of the undercuts and the outside diameter of each relief area 184 and 187 is smaller than the original diameter prior to creating the undercuts. These differences necessitate a different coil design in order to achieve the desired heating pattern across and around the entirety of the "undercut" split pin pair including pins 182 and 183. While various coil designs might work to some degree, the focus of the present invention and the focus of earlier and related applications and patents is to try and optimize the induction heating pattern for the particular part or portion and thus our reference to the desired heating pattern is really what is believed to be the preferred or optimal heating pattern for the particular part or portion.

While a 90 degree coil and a 180 degree offset coil have each been illustrated and described in the context of this invention, there is a "hybrid" coil which has been designed specifically for induction heating (i.e., induction hardening) of the "undercut" split pin pair which is illustrated in FIG. 20.

Figure 22:
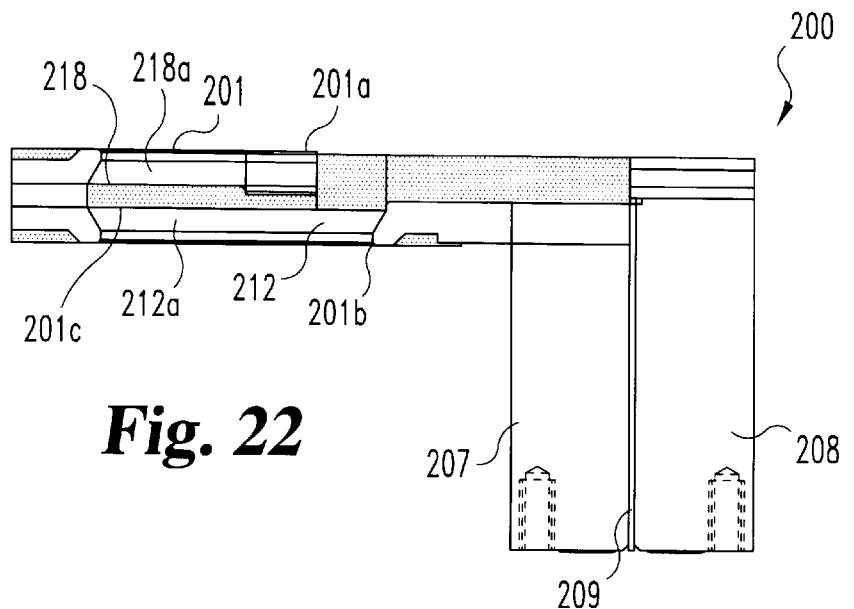
FIG. 22 is a front elevational view of the FIG. 21 induction hardening coil assembly.
Figure 21:
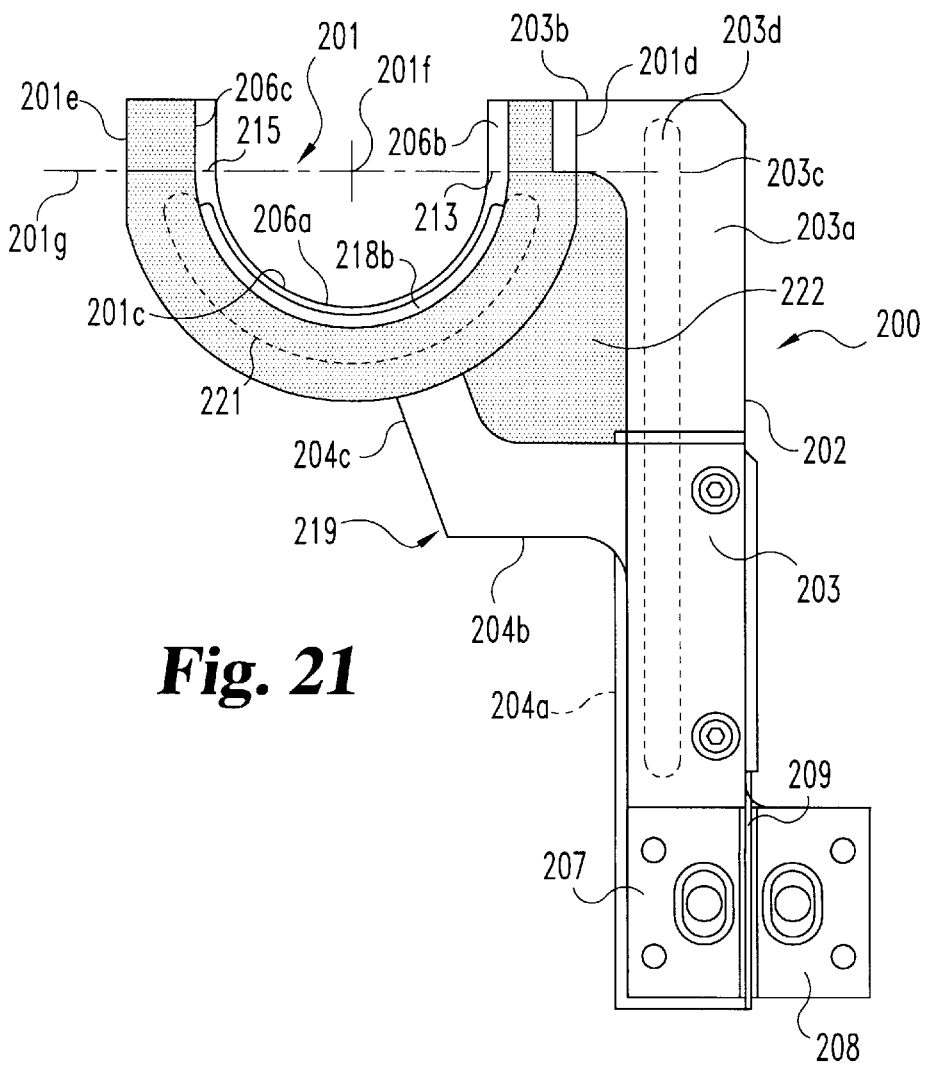
FIG. 21 is a bottom plan view of a "hybrid" induction hardening coil assembly as it is used according to the present invention.

With specific reference to FIGS. 21 through 23, coil assembly 200 is referred to as a "hybrid" coil assembly because it does not fit precisely within the definition of a 90 degree coil nor precisely within the definition of a 180 degree offset coil, as those coil styles are described and defined herein. In many respects, coil assembly 200 is similar to coil assemblies 100 and 110 (or 116) including the general construction for electrical continuity and insulation and in particular the interior cooling passageways and the option for quench apertures (see FIG. 6A). The cooling passageways are not illustrated for coil assembly 200, but are present in coil assembly 200 and are constructed and arranged in a manner similar to what is illustrated for coil assemblies 100 and 110.

With continued reference to FIGS. 21 through 23, coil assembly 200 includes coil 201 and support arm 202. Support arm 202 is constructed with a current-in portion 203 and a current-out portion 204. The electrical continuity path for the incoming current begins with the transformer and from there to the support arm 202. The electrical continuity path through the coil assembly 200 is described in the context of how the current travels through this continuity path. Portions 203 and 204 are electrically insulated from each other by insulator strip 205 and are in effect staggered top to bottom one from the other with regard to the ends which connect to coil 201. FIG. 21 is a bottom plan view of coil assembly 200 as it is arranged in cooperation with coil assembly 300. See FIG. 28. FIG. 21A is a top plan view of coil assembly 200 as it is arranged in cooperation with coil assembly 300. Referring first to FIGS. 21, 22, and 23, coil 201, like coils 100*a* and 110*a*, includes a first surface 201*a*, a second, opposite surface 201*b*, and an inner coil curvature 201*c* extending therebetween. A first side surface 201*d* is at one end of the inner coil curvature 201*c* and a second side surface 201*e* is at the opposite end of the inner coil curvature.

Connection blocks 207 and 208 are constructed and arranged to mechanically and electrically connect to an electrical bus bar (not illustrated) which is operably connected to a transformer (not illustrated). An electrical insulation strip 209 is positioned between connection blocks 207 and 208. Connection block 207 is integral with the current-in portion 203 and may be welded or brazed in order to create this integral construction. Similarly, connection block 208 is integral with the current-out portion 204 and may be welded or brazed in order to create this integral construction. The oblong outline 203*c* extending the length of portion 203 denotes a cover plate 203*d* which encloses part of the cooling passageway that is machined into portion 203. The cover plate 203*d* is welded or brazed into position.

Hybrid coil assembly 200 would likely be considered closer to the 180 degree offset coil style than the 90 degree coil style due to the current path crossover (bottom to top) at one end of the coil 201 rather than at both ends and in the center which is the pattern for the 90 degree coil. Coil assembly 200 may also be considered closer to the design of the 180 degree offset coil style because the initial current path extends from one end of the coil 201 for at least 180 degrees to the opposite end of the coil where the first crossover from the lower conductive surface to the upper conductive surface occurs. "Lower" and "upper" (or "bottom" and "top") are used herein in the context of how the coil assembly 200 is oriented and positioned in actual use relative to the floor. The coil 201 includes a 180 degree main section 206*a* and two end sections 206*b* and 206*c*. Sections 206*b* and 206*c* extend between first surface 201*a* and second surface 201*b*. The coil axis 201*f* denotes the dividing line between the main section 206*a* on one side of the axis 201*f* and the two end sections 206*b* and 206*c* on the opposite side. The inner surfaces of end sections 206*b* and 206*c* are substantially parallel to each other and substantially perpendicular to coil centerline 201*g*.

The incoming current from the connected transformer travels to coil 201 by way of the current-in portion 203 and connection block 207. Portion 203 is formed with an approximate 90 degree turn from linear section 203*a* to connection section 203*b*. Current-in portion 203 via section 203*b* connects to surface 201*b* and conductive portion 212 via end section 206*b*. Coil 201 is a generally semicylindrical form with a first conductive portion 212, part of the first surface 201*b*, that begins at coil end 213 and extends around the inner face of coil 201 (i.e., the inner coil curvature 201*c*) for approximately 180 degrees, terminating at end 215 which represents the free end of coil 201. Due to the axial thickness of conductive portion 212, it should be understood that the exposed face 212*a* is semicylindrical in form.

At coil end 215, the first conductive portion 212 electrically and mechanically connects to a second conductive portion 218 (part of the second surface 201*a*). Conductive portion 218 electrically and mechanically connects to current-out portion 204 which in turn electrically and mechanically connects to connection block 208. Current-out portion 204 of support arm 202 includes an integral combination of linear section 204*a*, bridge section 204*b*, and connecting section 204*c*. Linear section 204*a* is integral with the connection block 208 and extends substantially parallel to linear section 203*a*, for only part of the length of linear section 203*a*. Section 204*a* then turns at an approximate 90 degree angle to merge with bridge section 204*b*. Bridge section 204*b* integrally joins with connecting section 204*c* at junction 219 which has an included angle of approximately 135 degrees. Connecting section 204*c* is integral with the second conductive portion 218 which has a part-semicylindrical shape and the specifics of this shape are described as follows.

Second conductive portion 218 includes an exposed surface 218*a* which is generally cylindrical over its circumferential length from free end 215 to portion end 218*b* where the second conductive portion 218 is integrally connected, electrically and mechanically, to connecting section 204*c*. Current-out portion 204 via sections 204*b* and 204*c* connects to surface 201*a* and conductive portion 218 at location 218*b*. With regard to the approximate 180 degrees of circumference represented by the exposed surface of coil 201, this is actually slightly more than 180 degrees. The second conductive portion 218 extends for approximately 110 degrees from end 215 to end 218*b*. Free end 215 is where the first conductive and second conductive portions are electrically connected to each other.

With the exception of end 215, there are electrical insulators between the first and second conductive portions 212 and 218, respectively. The presence of these electrical insulators ensures electrical isolation and provides for a single current path (continuity path) through the coil assembly 200. This current path begins at connection block 207, travels through the current-in portion 203, and then through the first conductive portion 212 from end 213 to the bottom to top crossover at end 215. The current path returns from end 215 through the second conductive portion 218 and back to end 218b. From end 218b, the current path flows back through current-out portion 204 and back to connection block 208.

A further feature of coil assembly 200 is the machining of relief areas over various surfaces and portions of the coil 201 and support arm 202 in order to fill these relief areas with insulative layers. The purpose of such a construction is for concentrating the heating due to the flowing current. These relief areas 221, 222, 223, 224 and 225 are not for the purpose of providing electrical insulation between (1) the current-in and current-out portions 203 and 204, respectively, of the support arm 202, nor between (2) the first and second conductive portions 212 and 218, respectively.

Figure 25:
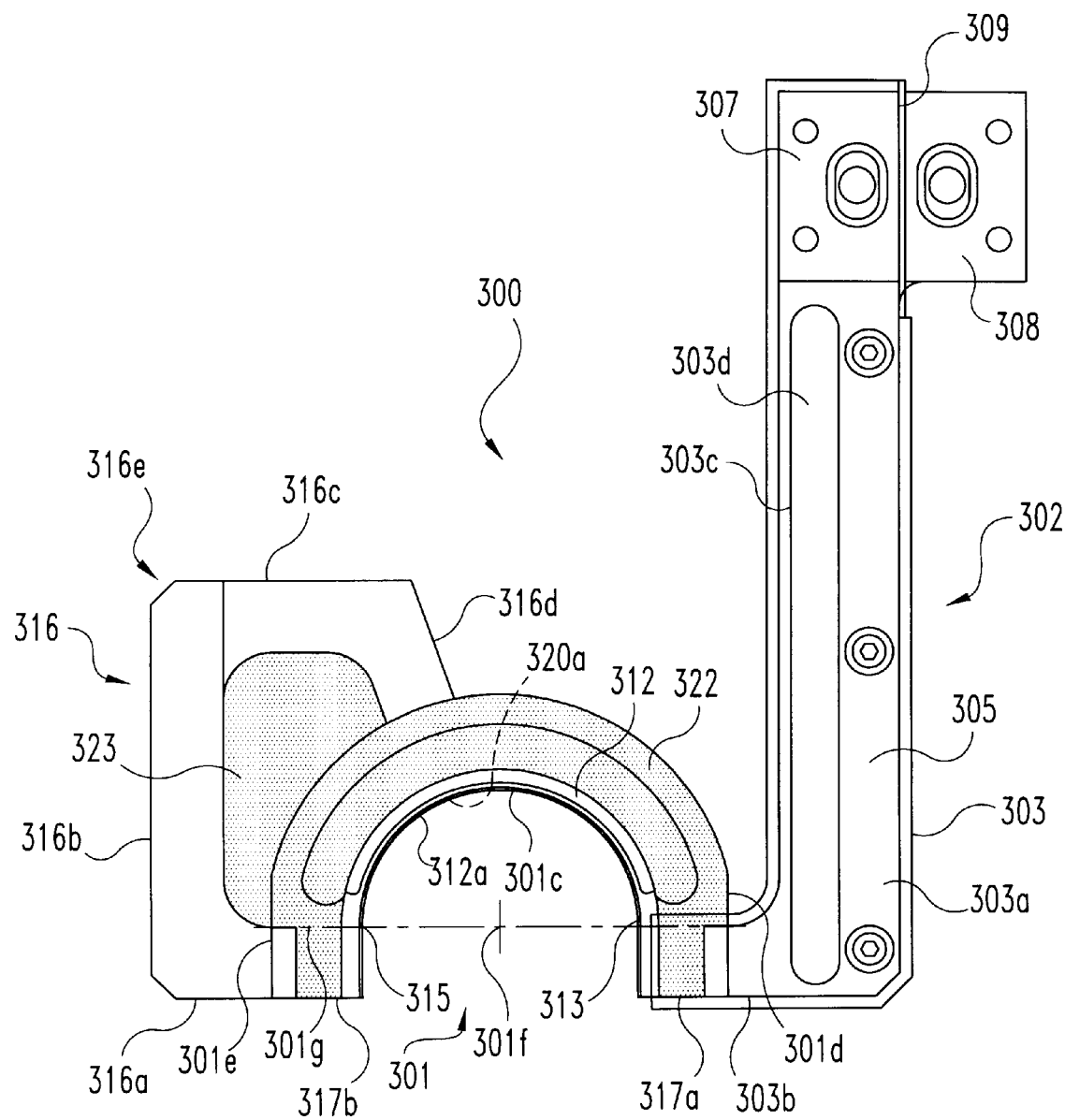
FIG. 25 is a top plan view of a "hybrid" induction hardening coil assembly according to the present invention.
Figure 26:
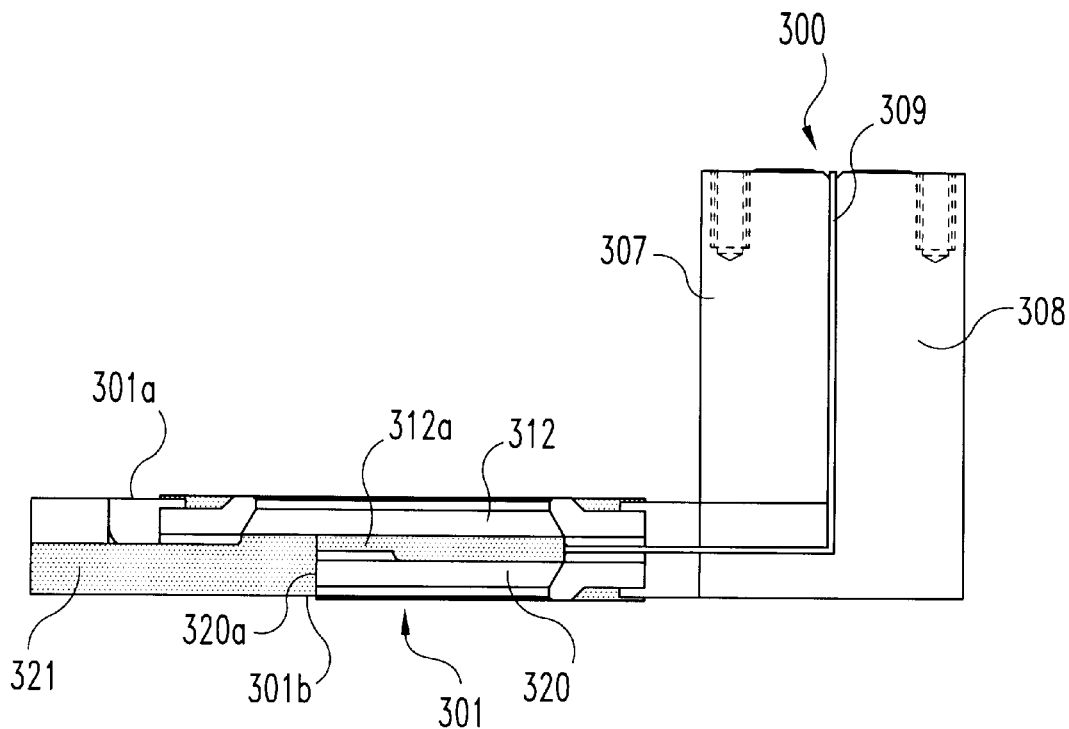
FIG. 26 is a front elevational view of the FIG. 25 induction hardening coil assembly.
Figure 27:
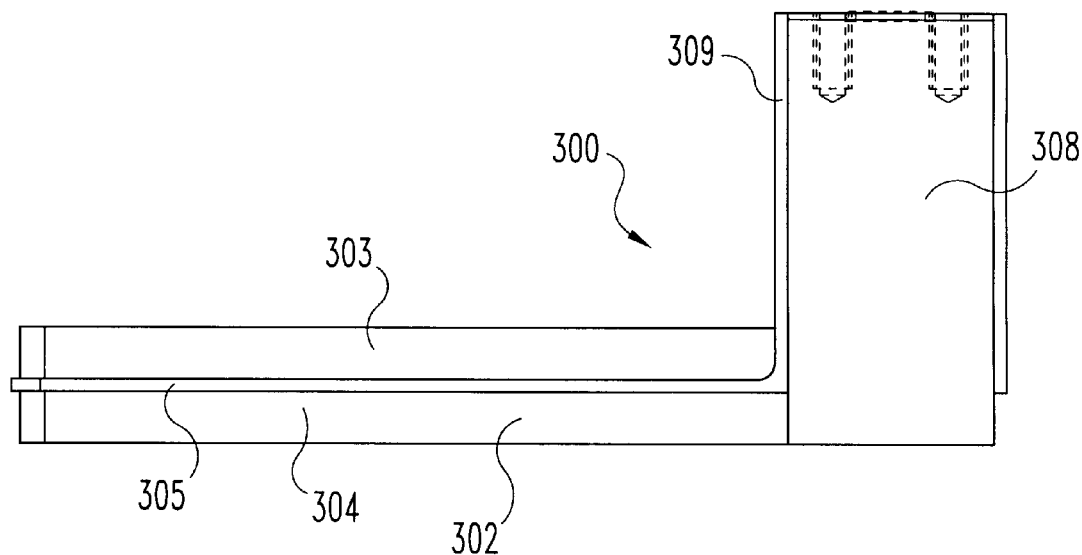
FIG. 27 is a right side elevational view of the FIG. 25 induction hardening coil assembly.

Regarding the plan view of FIG. 21A, this shows the upper or top surface 230 of coil assembly 200 which faces (in close proximity) the bottom or lower surface of the cooperating coil assembly 300 (see FIGS. 25, 26 and 27). Planar surface 230 includes a first insulative layer 231 positioned along current-out portion 204, a second insulative layer 232, and a curved, third insulative layer 233. A portion 234 of the second conductive portion 218 (part-cylindrical) is shown with a matching curvature against the inner curved edge 235 of layer 233. The upper surface of bridge section 204b and connecting section 204c is represented by portion 236. In view of the electrical continuity through the coil assembly 200 which is present from connection block 207 to connection block 208, insulative layers 231, 232, and 233 do not create any current path discontinuities. They are insulative "layers" used in part to insulate surfaces and used in part to focus and concentrate the heating energy at the most critical portions of the coil assembly.

Figure 24:
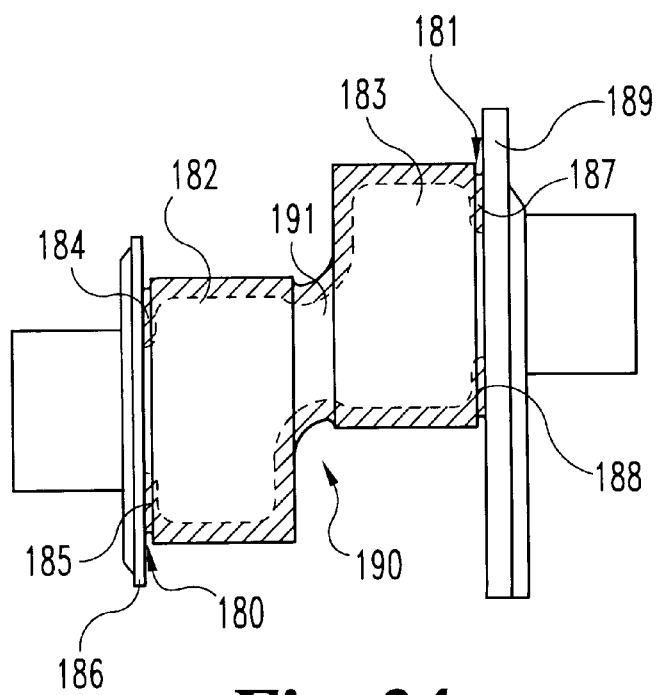
FIG. 24 is a partial, diagrammatic illustration of the resultant heating pattern in an undercut split pin pair in accordance with the present invention.

In order to create the heating pattern for the undercut split pin pair of FIG. 20, as diagrammatically illustrated in FIG. 24, a second "hybrid" coil assembly is used in cooperation with coil assembly 200. With reference to FIGS. 25, 26, and 27, the second "hybrid" coil assembly 300 has a construction and current path which are very similar to coil assembly 200. With specific reference to FIGS. 25–27, coil assembly 300 includes coil 301 and support arm 302. Support arm 302 is constructed with a current-in portion 303 and a current-out portion 304. The electrical continuity path for the incoming current begins with the transformer and from there to the support arm 302. The electrical continuity path through the coil assembly 300 is described in the context of how the current travels through this continuity path. Portions 303 and 304 are electrically insulated from each other by insulator strip 305 and are in effect staggered top to bottom one from the other with regard to the ends which connect to coil 301. Coil 301, like coils 100a, 110a, and 201, includes an upper or top surface 301a, a lower or underside surface 301b, and an inner coil curvature 301c extending therebetween. A first side surface 301d is at one end of the inner coil curvature 301c and a second side surface 301e is at the opposite end of the inner coil curvature.

Connection blocks 307 and 308 are constructed and arranged to mechanically and electrically connect to an electrical bus bar (not illustrated) which is operably connected to a transformer (not illustrated). An electrical insulation strip 309 is positioned between connection blocks 307 and 308. Connection block 307 is integral with the current-in portion 303 and may be welded or brazed in order to create this integral construction. Similarly, connection block 308 is integral with the current-out portion 304 and may be welded or brazed in order to create this integral construction. The oblong outline 303c extending the length of portion 303 denotes a cover plate 303d which encloses part of the cooling passageway that is machined into portion 303. The cover plate 303d is welded or brazed into position.

Hybrid coil assembly 300 would likely be considered closer to the 180 degree offset coil style than the 90 degree coil style due to the current path crossover (top to bottom) generally adjacent to one end of the coil 301 rather than at both ends and in the center which is the pattern for the 90 degree coil. Coil assembly 300 may also be considered closer to the design of the 180 degree offset coil style because one portion of the current path extends from one end of the coil 301 approximately 180 degrees to the opposite end of the coil including a crossover from the upper conductive surface to the lower conductive surface.

The incoming current from the connected transformer travels to coil 301 by way of the current-in portion 303 and connection block 307. Portion 303 is formed with an approximate 90 degree turn from linear section 303a to connection section 303b. Coil 301 is a generally semicylindrical form with an upper conductive portion 312, part of the top surface 301a, that begins at coil end 313 and extends around the inner face of coil 301 (i.e., the inner coil curvature 301c) for approximately 180 degrees, terminating at end 315 which represents the end of the semicylindrical portion of coil 301. Due to the axial thickness of conductive portion 312, it should be understood that the exposed face 312a is semicylindrical in form.

At coil end 315, the upper conductive portion mechanically and electrically connects to bridge portion 316. Bridge portion 316 includes four integral sections, including sections 316a, 316b, 316c, and 316d. Section 316a is generally oriented near a radial line (301g) from the coil curvature axis 301f, which line defines the end surface of coil ends 313 and 315. The included angle between sections 316a and 316b is approximately 90 degrees. The included angle between sections 316b and 316c is approximately 90 degrees. The included angle between sections 316c and 316d is approximately 110 degrees. The inner coil curvature 301c extends for a full 180 degrees between ends 313 and 315 and further extends into connecting end sections 317a and 317b. Sections 317a and 317b extend between top surface 301a and underside surface 301b. The inner surfaces of sections 317a and 317b are substantially parallel to each other and substantially perpendicular to coil centerline 301g. As illustrated in FIG. 25, it will be seen that connection section 303b and section 316a are on the opposite side of the coil curvature axis 301f and centerline 301g from the main 180 degree section of the coil curvature. Current-in potion 303 via section 303b connects to surface 301a and conductive portion 312 via end section 317a. Similarly, the current-out portion 304 connects to surface 301b and conductive portion 320 via end section 317a.

The current (continuity) path follows, in order, from end 315 to sections 316a to 316b to 316c to 316d and then to lower conductive portion 320. At the corner 316e between and defined by section 316b and section 316c, the current path reaches the crossover point and extends down through that corner 316e to sections 316c and 316d and then to lower conductive portion 320. The lower conductive portion 320 extends for approximately 110 degrees from location 320a to first coil end 313 and across the inner surface of section 317a which connects to the current-out portion 304. Accordingly, location 320a is approximately 70 degrees around the coil curvature from end 315. The current-out portion 304 includes a first section 304a which is mechanically and electrically connected to end 313 and section 317a. Integral with section 304a is a second section 304b which is integral with connection block 308. Section 304a is oriented at a right angle to section 304b.

With the exception of corner 316e, there are electrical insulators between the upper and lower conductive portions 312 and 320, respectively. The presence of these electrical insulators ensures electrical isolation and provides for a single continuity path through the coil assembly 300. This current or continuity path begins at connection block 307, travels through the current-in portion 303, and then through the upper conductive portion 312 from end 313 to end 315. The current path exits from end 315 via section 317b and section 316a of bridge portion 316. At corner 316e, the continuity path shifts from the upper portion of the coil assembly to the lower portion. The path continues from section 316b into section 316c and then to section 316d which connects to the lower conductive portion 320. The path then continues back to section 317a and end 313. From end 313 the current path flows back through current-out portion 304 and back to connection block 308.

A further feature of coil assembly 300 is the machining of relief areas over various surfaces and portions of the coil 301 and support arm 302 in order to fill these relief areas with insulative layers. The purpose of such a construction is for concentrating the heating due to the flowing current. These relief areas 321, 322, and 323 are not for the purpose of providing electrical insulation between (1) the current-in and current-out portions 303 and 304, respectively, of the support arm 302, nor between (2) the upper and lower conductive portions 312 and 320, respectively.

Figure 28:
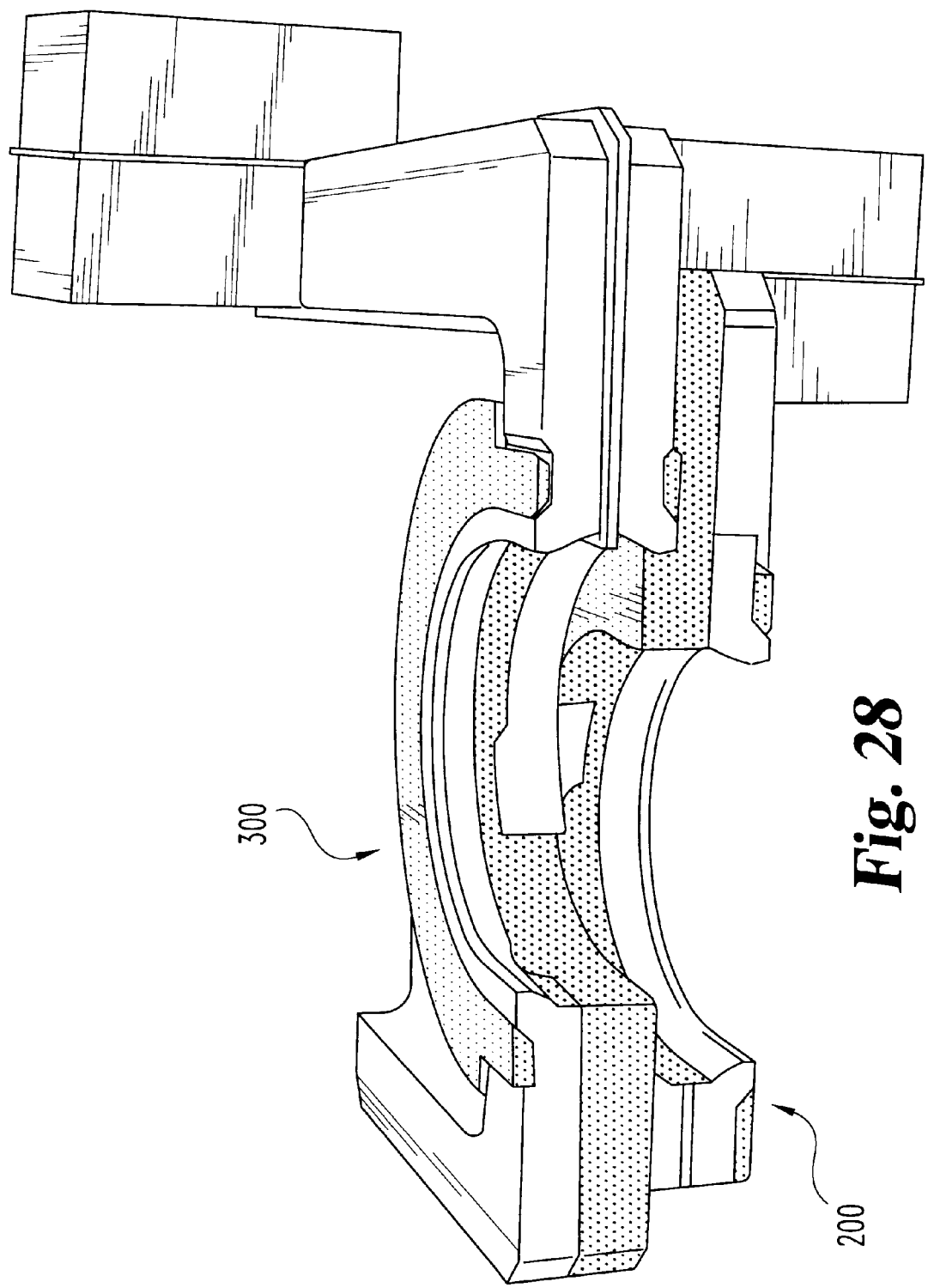
FIG. 28 is a perspective view of the overlapping coil assembly arrangement including one FIG. 21 coil assembly and one FIG. 25 coil assembly as used for the FIG. 20 split pin pair.

As explained, in order to create the heating pattern for the undercut split pin pair of FIG. 20 as illustrated in FIG. 24, one coil assembly 200 is used in combination with one coil assembly 300. This side-by-side arrangement of these two coil assemblies, as they would be oriented and used for the undercut split pin pair 182 and 183 is illustrated in FIG. 28.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An induction coil assembly for induction hardening of a portion of a workpiece, said induction coil assembly comprising:

a coil having a top surface, an underside surface, and an inner coil curvature disposed between said top surface and said underside surface, said inner coil curvature extending approximately 180 degrees around a coil axis, said coil further including a first end section adjacent a first end of said inner coil curvature, and extending between said top surface and said underside surface and a second end section adjacent a second end of said inner coil curvature and extending between said top surface and said underside surface; and a support arm connected to said coil and being constructed and arranged for providing an electrical connection between said coil and a source of electrical current, said support arm including a current-in portion connected to said top surface via said first end section and a current-out portion connected to said underside surface between said first and second end sections.

2. The induction coil assembly of claim 1 wherein said second end electrically connects said top surface and said underside surface as part of a current crossover path of said coil.

3. The induction coil assembly of claim 2 wherein said current-out portion connects to said underside surface at a location adjacent said inner coil curvature which is approximately 110 degrees from said second end.

4. The induction coil assembly of claim 3 which further includes a plurality of relief areas which receive electrical insulation material.

5. The induction assembly of claim 4 wherein said current-in portion includes a liquid flow passageway and wherein said current-out portion includes a liquid flow passageway.

6. The induction coil assembly of claim 5 wherein said support arm includes a connection block portion which is constructed and arranged to connect to a source of electrical current.

7. The induction coil assembly of claim 1 wherein said current-out portion connects to said underside surface at a location adjacent said inner coil curvature which is approximately 110 degrees from said second end.

8. The induction coil assembly of claim 1 which further includes a plurality of relief areas which receive electrical insulation material.

9. The induction coil assembly of claim 1 wherein said current-in portion includes a liquid flow passageway and wherein said current-out portion includes a liquid flow passageway.

10. The induction coil assembly of claim 1 wherein said support arm includes a connection block portion which is constructed and arranged to connect to a source of electrical current.

11. An induction coil assembly for induction hardening of a portion of a workpiece, said induction coil assembly comprising:

a coil having a top surface, an underside surface, and an inner coil curvature disposed between said top surface and said underside surface, said inner coil curvature extending approximately 180 degrees around a coil axis and including an electrically-conductive first portion and an electrically-conductive second portion, said coil further including a first end section adjacent a first end of said inner coil curvature, and extending between said top surface and said underside surface and a second end section adjacent a second end of said inner coil curvature and extending between said top surface and said underside surface; and a support arm connected to said coil and being constructed and arranged for providing an electrical connection between said coil and a source of electrical current, said support arm including a current-in portion electrically connected to said first portion and a current-out portion electrically connected to said second portion at a location between said first and second end sections.

12. The induction coil assembly of claim 11 wherein said second end electrically connects said first portion to said second portion as part of a current crossover path of said coil.

13. The induction coil assembly of claim 11 wherein said current-out portion connects to said second portion at a location adjacent said inner coil curvature which is approximately 110 degrees from said second end.

14. The induction coil assembly of claim 11 which further includes a plurality of relief areas which receive electrical insulation material.

15. The induction coil assembly of claim 11 wherein said current-in portion includes a liquid flow passageway and wherein said current-out portion includes a liquid flow passageway.

16. The induction coil assembly of claim 11 wherein said support arm includes a connection block portion which is constructed and arranged to connect to a source of electrical current.

17. An induction coil assembly for induction hardening of a portion of a workpiece, said induction coil assembly comprising:
   a coil having a first surface, an oppositely-disposed second surface, and an inner coil curvature disposed between said first surface and said oppositely-disposed second surface, said inner coil curvature extending approximately 180 degrees around a coil axis, said coil further including a first end section adjacent a first end of said inner coil curvature, and extending between said first surface and said oppositely-disposed second surface and a second end section adjacent a second end of said inner coil curvature and extending between said first surface and said oppositely-disposed second surface; and
   a support arm connected to said coil and being constructed and arranged for providing an electrical connection between said coil and a source of electrical current, said support arm including a current-in portion connected to said first surface via said end section and a current-out portion connected to said oppositely-disposed second surface via said first end section.

18. The induction coil assembly of claim 17 which further includes a bridge section connecting said first surface to said oppositely-disposed second surface, said bridge section having one end connected to said second end section and a second end connected to said oppositely-disposed second surface at a location between said first end section and said second end section.

19. The induction coil assembly of claim 18 wherein said location between said first end section and said second end section is approximately 70 degrees from said second end section.

20. The induction coil assembly of claim 19 which further includes a plurality of relief areas which receive electrical insulation material.

21. The induction coil assembly of claim 17 which further includes a plurality of relief areas which receive electrical insulation material.

22. The induction coil assembly of claim 17 wherein said current-in portion includes a liquid flow passageway and wherein said current-out portion includes a liquid flow passageway.

23. The induction coil assembly of claim 17 wherein said support arm includes a connection block portion which is constructed and arranged to connect to a source of electrical current.

24. An induction coil assembly for induction hardening of a portion of a workpiece, said induction coil assembly comprising:
   a coil having a first surface, an oppositely-disposed second surface, and an inner coil curvature disposed between said first surface and said oppositely-disposed second surface, said inner coil curvature extending approximately 180 degrees around a coil axis and including an electrically-conductive first portion and an electrically-conductive second portion, said coil further including a first end section adjacent a first end of said inner coil curvature, and extending between said first surface and said oppositely-disposed second surface and a second end section adjacent a second end of said inner coil curvature and extending between said first surface and said oppositely-disposed second surface; and
   a support arm connected to said coil and being constructed and arranged for providing an electrical connection between said coil and a source of electrical current, said support arm including a current-in portion electrically connected to said first portion and a current-out portion electrically connected to said second portion via said first end section.

25. The induction coil assembly of claim 24 which further includes a bridge section connecting said electrically-conductive first portion to said electrically-conductive second portion, said bridge section having one end connected to said electrically-conductive first portion and a second end connected to said electrically-conductive second portion at a location between said first end section and said second end section.

26. The induction coil assembly of claim 25 wherein said connection location is approximately 70 degrees from said second end section.

27. The induction coil assembly of claim 26 which further includes a plurality of relief areas which receive electrical insulation material.

28. A cooperating pair of induction coil assemblies for induction hardening a split pin pair of a crankshaft, said cooperating pair of induction coil assemblies comprising:
   a first induction coil assembly according to claim 1; and
   a second induction coil assembly according to claim 17, said first and second induction coil assemblies being axially positioned relative to said crankshaft in overlapping relation to each other.

29. A cooperating pair of induction coil assemblies for induction hardening a split pin pair of a crankshaft, said cooperating pair of induction coil assemblies comprising:
   a first induction coil assembly according to claim 11; and
   a second induction coil assembly according to claim 24, said first and second induction coil assemblies being axially positioned relative to said crankshaft in overlapping relation to each other.

* * * * *